(12) United States Patent
Silva et al.

(10) Patent No.: US 10,642,275 B2
(45) Date of Patent: May 5, 2020

(54) OCCULSION AWARE PLANNING AND CONTROL

(71) Applicant: Zoox, Inc., Foster City, CA (US)

(72) Inventors: William Anthony Silva, San Fransisco, CA (US); Dragomir Dimitrov Anguelov, San Francisco, CA (US); Benjamin Isaac Zwiebel, Burlingame, CA (US); Juhana Kangaspunta, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 94 days.

(21) Appl. No.: 16/011,468

(22) Filed: Jun. 18, 2018

(65) Prior Publication Data
US 2019/0384302 A1 Dec. 19, 2019

(51) Int. Cl.
*G05D 1/02* (2020.01)
*G05D 1/00* (2006.01)
(Continued)

(52) U.S. Cl.
CPC .......... *G05D 1/0214* (2013.01); *G01S 17/936* (2013.01); *G05D 1/0088* (2013.01);
(Continued)

(58) Field of Classification Search
CPC .......... G05D 1/0214; G05D 1/02; G05D 1/00; G06K 9/00; G06T 7/246; B60W 50/04; B60W 30/09; B60W 50/00
See application file for complete search history.

(56) References Cited

U.S. PATENT DOCUMENTS 6,055,042 A 4/2000 Sarangapani
6,173,215 B1 1/2001 Sarangapani
(Continued)

FOREIGN PATENT DOCUMENTS

EP 3229041 A1 10/2017
WO WO2013162559 A1 10/2013

OTHER PUBLICATIONS

Isele et al., "Navigating Occluded Intersections with Autonomous Vehicles using Deep Reinforcement Learning", 2018 IEEE International Conference on Robotice and Austomation (ICRA), IEEE, May 21, 2018, pp. 2034-2039.
(Continued)

*Primary Examiner* — Yuri Kan
(74) *Attorney, Agent, or Firm* — Lee & Hayes, P.C.

(57) ABSTRACT

Techniques are discussed for controlling a vehicle, such as an autonomous vehicle, based on occluded areas in an environment. An occluded area can represent areas where sensors of the vehicle are unable to sense portions of the environment due to obstruction by another object. An occlusion grid representing the occluded area can be stored as map data or can be dynamically generated. An occlusion grid can include occlusion fields, which represent discrete two- or three-dimensional areas of driveable environment. An occlusion field can indicate an occlusion state and an occupancy state, determined using LIDAR data and/or image data captured by the vehicle. An occupancy state of an occlusion field can be determined by ray casting LIDAR data or by projecting an occlusion field into segmented image data. The vehicle can be controlled to traverse the environment when a sufficient portion of the occlusion grid is visible and unoccupied.

20 Claims, 11 Drawing Sheets

(51) Int. Cl.
*G06K 9/00* (2006.01)
*G06T 7/246* (2017.01)
*B60W 50/04* (2006.01)
*B60W 30/09* (2012.01)
*B60W 50/00* (2006.01)
*G08G 1/16* (2006.01)
*G06T 7/10* (2017.01)
*G01S 17/93* (2020.01)
*G06F 16/29* (2019.01)

(52) U.S. Cl.
CPC ......... *G05D 1/024* (2013.01); *G05D 1/0248* (2013.01); *G05D 1/0274* (2013.01); *G06F 16/29* (2019.01); *G06K 9/00805* (2013.01); *G06T 7/10* (2017.01); *G08G 1/166* (2013.01); *G05D 2201/0213* (2013.01); *G06T 2207/30241* (2013.01); *G06T 2207/30261* (2013.01)

(56) References Cited

U.S. PATENT DOCUMENTS

| | | | |
|---|---|---|---|
| 9,315,192 B1 | 4/2016 | Zhu et al. | |
| 9,612,123 B1 | 4/2017 | Levinson et al. | |
| 10,037,613 B1 * | 7/2018 | Becker | G06K 9/00805 |
| 10,268,191 B1 * | 4/2019 | Lockwood | G05D 1/0022 |
| 10,296,794 B2 * | 5/2019 | Ratti | G06K 9/3233 |
| 2015/0057907 A1 * | 2/2015 | Rebhan | B60W 50/0097 701/93 |
| 2016/0129917 A1 * | 5/2016 | Gariepy | G05D 1/0011 701/2 |
| 2017/0369051 A1 * | 12/2017 | Sakai | B60W 30/09 |
| 2019/0065864 A1 * | 2/2019 | Yu | G06K 9/00805 |
| 2019/0212746 A1 * | 7/2019 | Cheng | G01K 3/14 |
| 2019/0272433 A1 * | 9/2019 | Yu | G06K 9/00805 |
| 2019/0384309 A1 | 12/2019 | Silva et al. | |

OTHER PUBLICATIONS

PCT Search Report and Written Opinion dated Sep. 19, 2019 for PCT Application No. PCT/US2019/037514, 14 pages.

Seo et al., "A Perception Mechanism for Supporting Autonomous Intersection Handling in Urban Driving", Intelligent Robots and Systems 2008, IROS 2008, IEEE/RSJ International Conference ON, IEEE, Piscataway, NJ, USA, Sep. 22, 2008, pp. 1830-1835.

PCT Search Report and Written Opinion dated Jan. 16, 2020 for PCT Application No. PCT/US2019/053013, 9 pages.

Office Action for U.S. Appl. No. 16/011,436, dated Mar. 4, 2020, Silva, "Occlusion Aware Planning", 11 pages.

* cited by examiner

OCCULSION AWARE PLANNING AND CONTROL

BACKGROUND

Various methods, apparatuses, and systems are utilized by autonomous vehicles to guide such autonomous vehicles through environments including any number of obstacles. For instance, autonomous vehicles utilize route planning methods, apparatuses, and systems to guide autonomous vehicles through congested areas that may include other vehicles, buildings, pedestrians, or other objects. In some examples, the vehicles, buildings, and/or objects in an environment can block areas of the environment from being visible to sensors of the autonomous vehicle, which can present challenges in planning a route through such areas.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
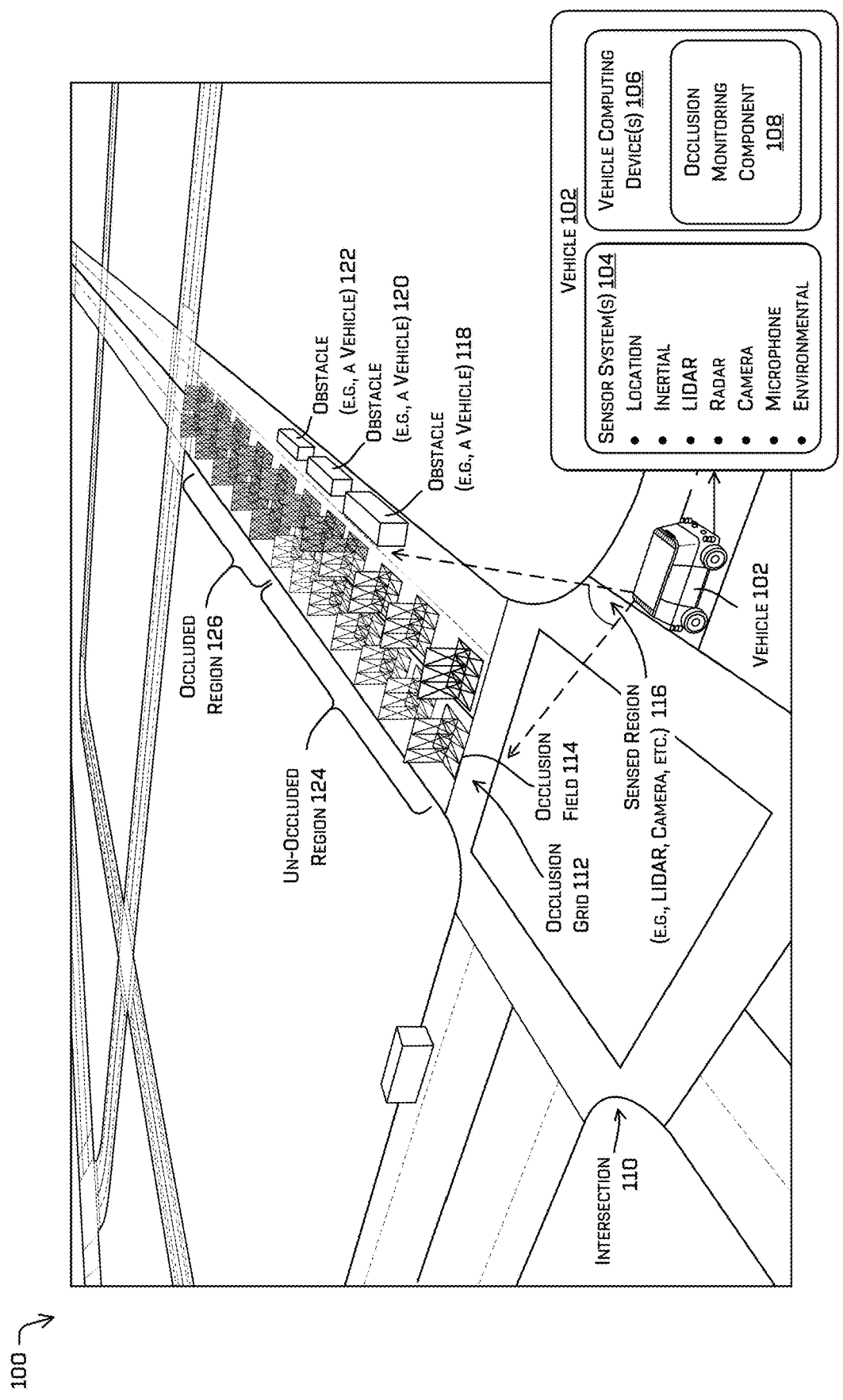
FIG. 1 is an environment illustrating a perspective view of an example occlusion grid comprising a plurality of occlusion fields in an environment, and illustrating a vehicle including an occlusion monitoring component to determine occluded and un-occluded regions of the occlusion grid resulting from obstacles, in accordance with embodiments of the disclosure.

This disclosure is directed to techniques for controlling a vehicle, such as an autonomous vehicle, based on occluded areas in an environment. For example, an occluded area can be represented by an occlusion grid, which may be stored in connection with map data or can be dynamically generated based on obstacles in an environment. An occlusion grid can include a plurality of occlusion fields, which can represent discrete areas of an environment, such as driveable surfaces. In some examples, an occlusion field can indicate an occlusion state (e.g., indicating whether the location is visible to one or more sensors of an autonomous vehicle) and an occupancy state (e.g., indicating whether the location is occupied by an object such as a vehicle, pedestrian, animal, etc.). In at least some examples, the occupancy state may further comprise an "indeterminate" state, which is to say that, based on the available data, it may be currently unknown whether the occlusion field is occupied or not. In some cases, the occlusion state and/or occupancy state can be determined using LIDAR data and/or image data captured by sensors on the autonomous vehicle. For example, the LIDAR data can be ray casted to determine whether the LIDAR rays have traveled through the regions of space represented by the occlusion fields. In some instances, a confidence level that the occlusion field is occupied or is not occupied can be based at least in part on a first number of expected LIDAR returns associated with the occlusion field and/or a second number of actual LIDAR returns associated with the occlusion field. In some instances, a confidence level that the occlusion field is occupied or not can be based at least in part on a number of LIDAR observations in a column of LIDAR returns with respect to a height of an occlusion field. In some instances, the occupancy of an occlusion field can be based on image data. For example, image data can be captured in an environment, and the image data can be segmented to generate segmented image data indicating driveable regions (e.g., road surfaces that are not occupied by an object). Location data representing the occlusion field can be projected into the segmented image data to determine whether the occlusion field is associated with a driveable surface. The occlusion states and occupancy states can be determined for all occlusion fields of an occlusion grid. In some examples, when the occlusion fields are all visible and unoccupied, the occlusion grid can be considered clear, and the autonomous vehicle can be controlled to traverse the environment.

In some examples, LIDAR data and image data can be used to determine the occlusion state and occupancy state of an occlusion field. For example, for occlusion fields that are relatively close to the autonomous vehicle, a resolution of the LIDAR sensor may be sufficient to determine the occlusion state and occupancy state of an occlusion field with a confidence level (also referred to as a confidence value) that meets or exceeds a threshold value. In some instances, if the confidence level does not meet or exceed a threshold (e.g., for occlusion fields that are relatively farther away from the autonomous vehicle or if a number of LIDAR rays associated with an occlusion field is below a threshold), the image data can be used to replace or supplement a determination regarding the occlusion state and/or occupancy state using the LIDAR data.

The techniques discussed herein can be used in a number of scenarios. In a first scenario, the occlusion based planning can be used when an autonomous vehicle navigates intersections where the autonomous vehicle is executing complex maneuvers, such as unprotected left turns, free right turns, or negotiating complex intersections. As can be understood, in such an example, oncoming traffic may not stop at the intersection, which can present challenges in determining when an intersection is safe to traverse. In one example, the autonomous vehicle can approach an intersection and stop at a stop line (e.g., that has been indicated in map data). An occlusion grid can be accessed from the map data, and the autonomous vehicle can capture sensor data to determine the states of the occlusion fields. In some instances, the autonomous vehicle can determine that a portion of the occlusion grid is occluded (e.g., due to an obstacle such as a parked car) and/or lacking sufficient information to proceed. In some examples, the autonomous vehicle may slowly traverse into the intersection to change a location of its sensors in the environment. The autonomous vehicle can continue to capture sensor data to determine the occlusion state and occupancy state of some or all occlusion fields in the occlusion region. If other vehicles are traversing the intersection, the occlusion fields will be determined to be occupied, and the autonomous vehicle may continue to wait for an appropriate time to traverse the intersection. If there are no other vehicles traversing the intersection, and the sensors are able to make determinations of the occupancy states of the fields, the occlusion fields will be unoccupied, the occlusion grid will be clear, and the autonomous vehicle may traverse the intersection. As can be understood, the occlusion based planning can be used for traversing may different intersections, and is not limited to any particular intersections or maneuvers.

In a second scenario, an autonomous vehicle may capture sensor data of an environment and can determine that an object in the environment is "blocking" the sensors from sensing a portion of the environment. In some instances, an occlusion grid can be dynamically associated with the object. In some examples, although the autonomous vehicle may know little information about the occlusion grid at an initial time (e.g., especially the occupancy of occlusion fields obscured by the obstacle), in some examples the autonomous vehicle can infer a context of the occlusion fields by monitoring a region where objects traverse prior to entering the occlusion grid. For example, as the autonomous vehicle monitors an occluded region of an occlusion grid, the autonomous vehicle can monitor for any objects (e.g., vehicles, pedestrians, etc.) entering the occlusion grid. After a period of time, if no objects have entered the occlusion grid, and if no objects have exited the occlusion grid, the autonomous vehicle may infer that the occlusion grid is unoccupied, and may execute a vehicle trajectory as appropriate.

In a third scenario, an autonomous vehicle can capture sensor data of an environment to identify an object in the environment. The autonomous vehicle can associate an occlusion grid with the object, as discussed herein. In some instances, the autonomous vehicle can also identify one or more dynamic objects, such as a pedestrian, in the environment that traversed into the occlusion region. The autonomous vehicle can monitor a track of the dynamic object prior to the object traversing into the occlusion region, and can generate one or more predicted trajectories associated with the object. In some instances, the one or more predicted trajectories can be based on a measured track of the dynamic object and/or based on reasonable paths (e.g., across a crosswalk or sidewalk, a continuation of the most recent trajectory, etc.) and/or destinations in the environment. Thus, even when a dynamic object is not observed, by virtue of the object being in an occluded region, the autonomous vehicle can incorporate predicted trajectories of the dynamic objects into determinations regarding control of the autonomous vehicle. Such predicted trajectories may be later confirmed by subsequent observations based on the dynamic object remaining in the occluded region or based on the dynamic object leaving the occluded region.

A fourth scenario is directed to occlusion regions caused by topographic obstacles, such as the crest of a hill. For example, as a vehicle approaches the crest (e.g., top) of a hill, the vehicle may not be able to see the ground surface on the other side of the hill crest. In some examples, a topographic occlusion grid can be associated with map data representing the hill region to facilitate traversing the hill. For example, the topographic occlusion grid (and other occlusion grids discussed herein) can include occlusion fields that represent a three-dimensional region of space in the environment. As can be understood, a vertical portion of the occlusion field may be visible to the vehicle approaching the crest of a hill without the vehicle being able to see the ground portion of the occlusion field. The vehicle can capture sensor data of the environment, such as LIDAR data, and can ray cast the LIDAR data through the occlusion fields of the occlusion grid to determine an occupancy of at least a portion of the occlusion field. Accordingly, by determining that a portion of the occlusion field is clear (e.g., an area of the occlusion field between 1-2 meters above the ground), the autonomous vehicle can determine the occupancy state of the occlusion field (e.g., occupied, unoccupied, or indeterminate). Thus, using the techniques discussed herein, the autonomous vehicle can "see over" the crest of the hill to acquire information about an environment without capturing sensor data of all regions of the environment.

In some instances, a size of an occlusion grid to be stored in connection with map data can be based at least in part on a number of region characteristics. In the context of an intersection, the region characteristics can include, but are not limited to, a distance across the intersection that the autonomous vehicle must travel (e.g., in order to be clear of oncoming traffic); a speed limit of vehicles in the intersection (e.g., of oncoming traffic); a safety factor associated with the speed limit (e.g., to effectively increase the speed of traffic to be expected); an acceleration level and/or average velocity of the autonomous vehicle traversing the intersection distance; and the like. Particular examples of such are discussed in detail below. Thus, the occlusion grid can be sized such that the autonomous vehicle can safely traverse a region when the occlusion grid is clear of obstacles.

In some instances, and as noted above, an occlusion grid can include a plurality of occlusion fields. In some instances, the occlusion fields can represent a temporal logic symbol that can be used in a temporal logic formula to evaluate or validate a trajectory of an autonomous vehicle. For example, the autonomous vehicle may be prevented from initiating a trajectory until an occupancy state and/or occlusion state of the occlusion fields are "unoccupied" and "un-occluded," respectively. In some instances, a planner system for the autonomous vehicle can use temporal logic, such as linear temporal logic or signal temporal logic, to evaluate trajectories for the autonomous vehicle.

The techniques discussed herein can improve a functioning of a computing device in a number of ways. For example, in the context of evaluating an occlusion grid, an area of the grid can be sized to ensure safe traversal of regions by the autonomous vehicle without excessive resources devoted to unnecessary determinations about the environment. In some instances, using multiple sensor modalities (e.g., LIDAR sensors, image sensors, RADAR sensors, etc.) can improve an overall confidence level associated with an occlusion state or occupancy state of an occlusion field. Improved trajectory generation can improve safety outcomes and can improve a rider experience (e.g., by ensuring an intersection is clear before initiating a trajectory, by reducing occurrences of emergency braking, swerving, and the like). These and other improvements to the functioning of the computer and/or to the user experience are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a robotic platform), and is not limited to autonomous vehicles. In another example, the techniques can be utilized in an aviation or nautical context, or in any system using machine vision. Additionally, the techniques described herein can be used with real data (e.g., captured using sensor(s)), simulated data (e.g., generated by a simulator), or any combination of the two.

FIG. 1 is an environment 100 illustrating a perspective view of an example occlusion grid comprising a plurality of occlusion fields in an environment. FIG. 1 also illustrates a vehicle including an occlusion monitoring component to determine occluded and un-occluded regions of the occlusion grid resulting from obstacles, in accordance with embodiments of the disclosure.

As illustrated, the environment 100 can include a vehicle 102 that includes one or more sensor system(s) 104 capturing data representing the environment 100.

For the purpose of illustration, the vehicle 102 can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In at least one example, and as noted above, the vehicle 102 can be associated with sensor system(s) 104 that can be disposed on the vehicle 102. The sensor system(s) 104 can include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, microphones, environment sensors (e.g., temperature sensors, humidity sensors, light sensors, pressure sensors, etc.), etc. The sensor system(s) 104 can generate sensor data, which can be utilized by vehicle computing device(s) 106 associated with the vehicle 102.

In at least one example, the vehicle computing device(s) 106 can utilize sensor data in an occlusion monitoring component 108. For example, the occlusion monitoring component 108 can access occlusion data and/or map data to determine occlusion state(s) and occupancy state(s) of occlusion fields in an occlusion grid.

By way of example, and without limitation, the vehicle 102 in the environment 100 is approaching an intersection 110. In some examples, the vehicle 102 can access map data and can determine that an occlusion grid 112 is associated with the intersection 110. In some examples, the intersection 110 can represent an intersection where the vehicle 102 is required to yield to one-way traffic entering the intersection 110.

The occlusion grid 112 can include a plurality of occlusion fields dividing a portion of the environment 100 into discrete regions. In some examples, an occlusion field 114 can represent an occlusion state (e.g., an indication of whether the occlusion field 114 is within a sensed region 116 associated with one or more sensors of the vehicle 102). As can be understood, the environment 100 may include one or more obstacles 118, 120, and 122 that cause a portion of the occlusion grid 112 to fall outside of the sensed region 116 of the vehicle 102. Accordingly, an un-occluded region 124 of the occlusion grid 112 can represent a region of the occlusion grid 112 that can be "seen" by the vehicle 102, which is to say, the vehicle 102 can capture sensor data representing the un-occluded region 124. Similarly, an occluded region 126 can represent a region of the occlusion grid 112 that cannot be "seen" by the vehicle 102. As illustrated in FIG. 1, the occlusion fields in the occluded region 126 are shaded gray to represent the lack of sensor data corresponding to that region, while the un-occluded region 124 is not shaded.

In some instances, when an occlusion field is occupied by an object, the occlusion field can store additional metadata indicating an identity of the object as well as data indicative of the path of the object through the occlusion grid.

Additional details directed to evaluating the occlusion fields using LIDAR data and image data are discussed below in connection with FIGS. 2 and 3, respectively.

Figure 2:
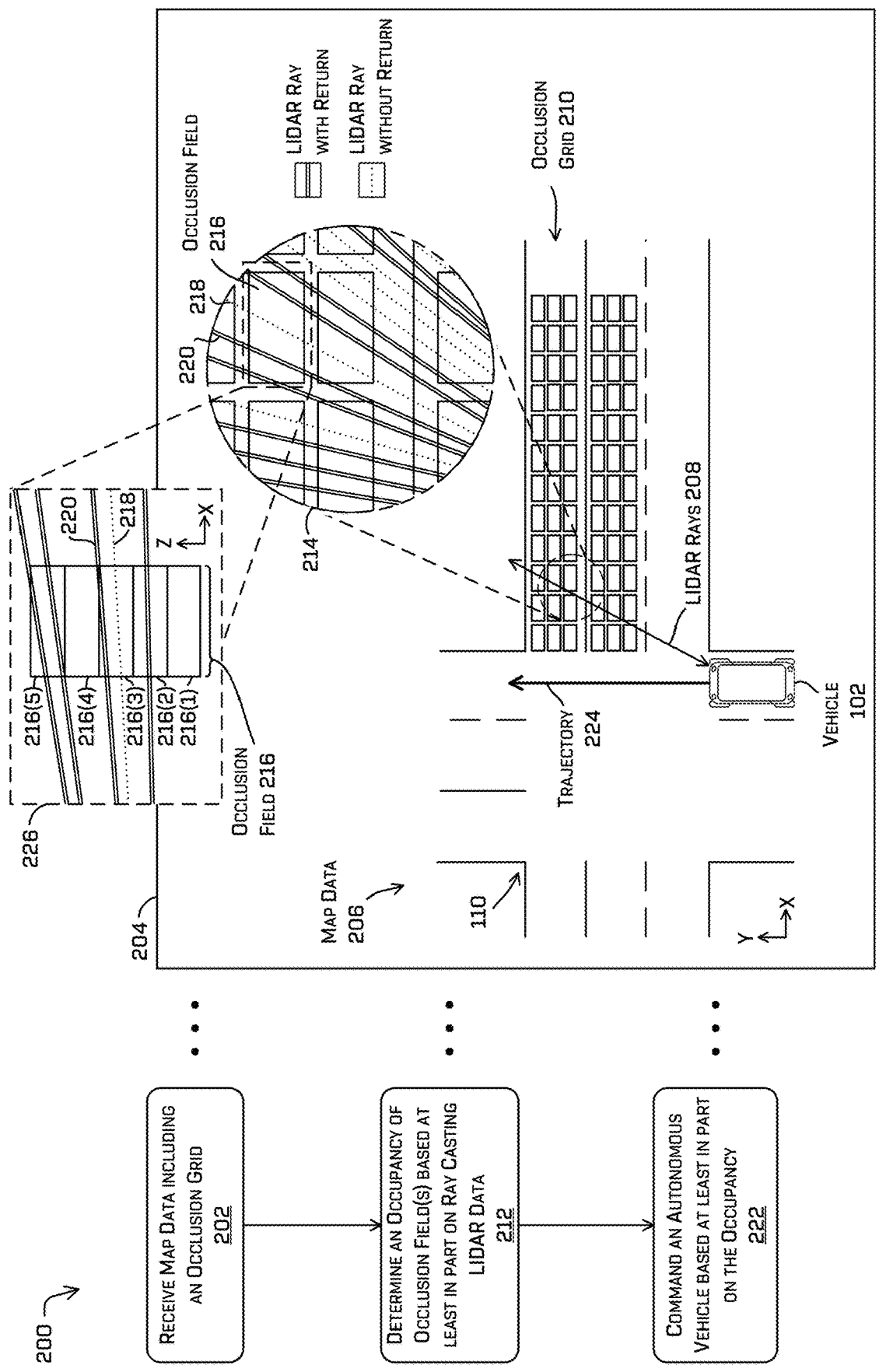
FIG. 2 is a pictorial flow diagram of an example process for determining an occupancy of occlusion field(s) in an occlusion grid based on ray casting LIDAR data, in accordance with embodiments of the disclosure.

FIG. 2 is a pictorial flow diagram of an example process 200 for determining an occupancy of occlusion field(s) in an occlusion grid based on ray casting LIDAR data, in accordance with embodiments of the disclosure. Although discussed in the context of LIDAR data, the example process 200 can be used in the context of RADAR data, SONAR data, time-of-flight image data, and the like.

At operation 202, the process can include receiving map data including an occlusion grid. An example 204 illustrates map data 206 that can be received in the operation 202. In some instances, the map data 206 can represent the intersection 110 as represent in FIG. 1. As further illustrated in the example 204, the vehicle 102 captures LIDAR data of the environment, as illustrated by the LIDAR rays 208. Although illustrated as a single line, the LIDAR rays 208 can include a plurality of light rays scanning the environment.

In some instances, the map data 206 includes an occlusion grid 210 including a plurality of occlusion fields 216. As discussed throughout this disclosure, the occlusion grid 210 can represent any size or shape of an environment. In some examples, the occlusion grid 210 can include a plurality of occlusion fields 216, whereby an individual occlusion field represents a discrete region of the environment. In some instances, an occlusion field may represent an area 1 meters wide, 3 meters long, and 2 meters high, although any size may be used for the occlusion field. In some instances, an occlusion field may be considered to be a "meta voxel" that represents a plurality of voxels of a voxelized space.

At operation 212, the process can include determining an occupancy of one or more occlusion fields based at least in part on ray casting LIDAR data. In a detail 214 of the environment, an occlusion field 216 is illustrated with LIDAR rays traversing the occlusion field 216. As indicated in the detail 214, LIDAR rays 218 and 220 are illustrated traversing the occlusion field 216. As illustrated further in the example 204, the LIDAR ray 218 can represent a LIDAR ray without a return, meaning the LIDAR ray 218 was emitted by a LIDAR sensor and expected to traverse through the occlusion field 216, but the vehicle 102 did not receive a return of the LIDAR ray 218. Such a lack of a return may be indeterminate of an occupancy state, as the LIDAR ray 218 may not have hit a surface to return, or may have reflected off of a reflective surface in a direction away from the LIDAR sensor. Further, the LIDAR ray 220 represents a LIDAR ray with a return, meaning the LIDAR ray 220 was emitted by a LIDAR sensor and was received by the vehicle 102 at a subsequent time (e.g., by virtue of reflecting off of an object in the environment).

In some instances, the LIDAR rays 208 may indicate that an occlusion field (e.g., the occlusion field 216) is occupied by an object, in which case the operation 212 can include determining that the occlusion field 216 is occupied. In at least some examples, an occupancy may be determined based on a number of LIDAR returns in a vertical column above a particular occlusion field 216 (e.g., as illustrated in a detail 226). As a non-limiting example, LIDAR returns may indicate that a region is occupied or that a LIDAR ray traversed through a region before being received as a reflection by a LIDAR sensor (e.g., the return may indicate that the region is unoccupied). In some examples, a LIDAR ray may traverse through a region without being received by the LIDAR sensor, discussed below.

As a non-limiting example, if a vertical column associated with the occlusion field 216 comprises 5 voxels (e.g., as illustrated by voxels 216(1), 216(2), 216(3), 216(4), and 216(5) in the detail 226), and a majority of them indicate that an object is located in the voxels, the occupancy state has met a threshold occupancy to determine the occlusion field 216 is occupied. In other words, in some instances, an occupancy of an occlusion field 216 can be based at least in part on an occupancy score associated with voxels associated with the occlusion field 216. Of course, the occlusion field can be associated with any number of vertical and/or horizontal voxels.

In some instances, the LIDAR rays 208 may indicate that the occlusion field 216 is not occupied by an object. For example, if a majority of the voxels associated with the occlusion field 216 indicate no return (and/or based on the number of LIDAR rays traversing through a voxel and associated with a return compared to a number of expected returns), it is most likely that there is no object occupying the occlusion field 216, as opposed to all of the rays reflecting off a surface in a direction away from the LIDAR sensor. In some instances, a determination regarding the occupancy of the occlusion field 216 can be associated with a confidence level. In some instances, a confidence level of an occupancy of an occlusion field can be based at least in part on a first number of expected LIDAR returns associated with the occlusion field and a second number of actual LIDAR returns (e.g., indicating an object or no object) associated with the occlusion field. By way of example, and without limitation, a confidence level can be based at least in part on a ratio of the second number and the first number. Of course, any techniques or heuristics can be used to determine a confidence level associated with an occupancy of the occlusion field. In some examples, where a confidence level is not exceeded, where no sensor data is returned, or where no determination of occupancy is otherwise able to be made, the occupancy state associated with the occlusion field 216 may be determined to be indeterminate (e.g., there is not enough information to determine the occupancy state).

At operation 222, the process can include commanding an autonomous vehicle based at least in part on the occupancy. For example, when the vehicle 102 determines that the occlusion field 216 is unoccupied (and that all occlusion fields of the occlusion grid 210 or that a threshold number of occlusion fields of the occlusion gird 210 are unoccupied), the vehicle 102 can be controlled to follow a trajectory 224 to traverse the intersection 110. In some examples, when the occlusion field 216 is occupied and/or when threshold number of occlusion fields of the occlusion grid 210 are occupied by an object, the operation 222 can include controlling the autonomous vehicle (e.g., the vehicle 102) to wait without traversing the intersection 110. In some examples, the threshold may be set, for example, based on the maximum speed limit expected, the lane width to traverse, and the like. Such a determination may be made, for example, based on the amount of time that it would take the vehicle 102 to traverse the intersection safely, assuming a vehicle to be proceeding in the occluded area toward the intersection at the maximum speed limit (plus some buffer). Additional details are discussed in connection with FIG. 5.

In some examples, the operation 222 can include selecting an acceleration level and/or velocity for the vehicle 102. For example, an occlusion field may indicate an occupied occlusion field that effectively reduces a size of the clear portion of the occlusion grid 210. In some instances, the operation 222 can include selecting a higher acceleration level (e.g., a "boost mode") causing the vehicle 102 to accelerate faster based on the reduced size of the clear portion (e.g., represented as the distance between the vehicle 102 and an occupied occlusion field) of the occlusion grid 210. In some instances, the operation 222 can include determining that a portion of the occlusion grid is not visible (e.g., similar to the occluded region 126) or otherwise comprise occupancy states which are indeterminate, and the operation 222 can include controlling the vehicle 102 to slowly move into the intersection (e.g., "creep forward") to increase the visible region of the occlusion grid 210. Additional examples are discussed throughout this disclosure.

Figure 3:
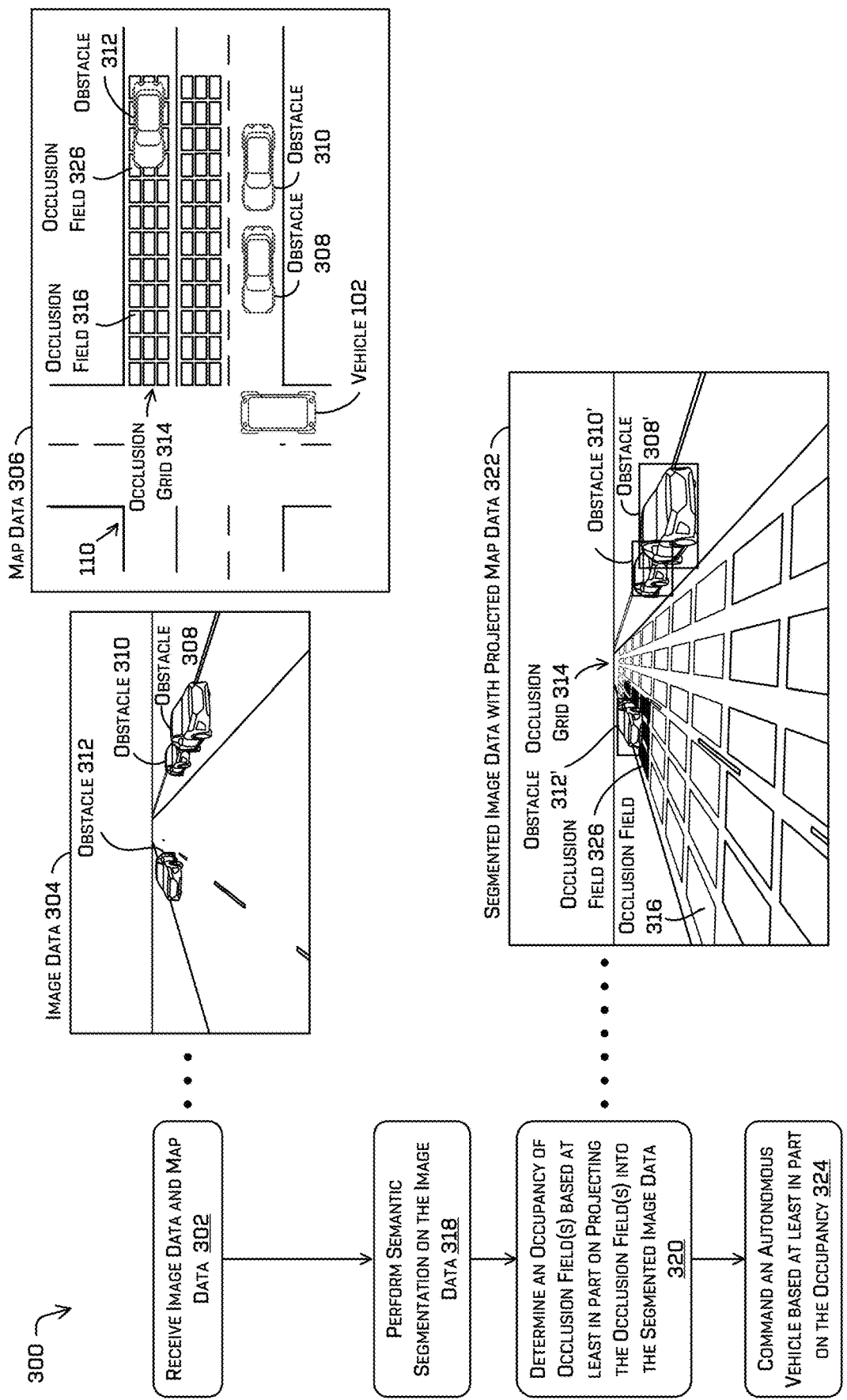
FIG. 3 is a pictorial flow diagram of an example process for determining an occupancy of occlusion field(s) in an occlusion grid based on projecting occlusion field(s) into image data, in accordance with embodiments of the disclosure.

FIG. 3 is a pictorial flow diagram of an example process 300 for determining an occupancy of occlusion field(s) in an occlusion grid based on projecting occlusion field(s) into image data, in accordance with embodiments of the disclosure.

At operation 302, the process can include receiving image data and map data. For example, image data 304 can be captured by one or more image sensors of the vehicle 102. In some examples, map data 306 may be accessed from memory (e.g., from the vehicle computing device(s) 106) upon determining that the vehicle 102 is approaching the intersection 110 associated with the map data 306.

In general, the image data 304 can include any image data captured by one or more image sensors of a vehicle. In some cases, the image data 304 can include representations of obstacles 308, 310, and 312. As illustrated, the obstacles 308, 310, and 312 can represent vehicles parked on the side of a road.

In general, the map data 306 can include an occlusion grid 314 including a plurality of occlusion fields, such as an occlusion field 316. In some instances, the map data 306 can include the obstacles 308, 310, and 312, although in some cases the data of the obstacles 308, 310, and 312 may not be considered to be map data. That is, in some cases, the map data 306 may only include static objects, in which case the obstacles 308, 310, and 312 (e.g., dynamic objects or potentially dynamic objects) may not be included as the map data 306. Further, the vehicle 102 may or may not be considered part of the map data 306, although the vehicle 102 is shown in the map data 306 to provide context and to illustrate the location of the vehicle 102 with respect to the intersection 110.

As illustrated, the obstacle 312 is represented driving in the road towards the intersection 110. In some examples, the obstacle 312 can occupy the occlusion field 326.

At operation 318, the process can include performing semantic segmentation on the image data. In some examples, the image data 304 can be input to a segmentation algorithm to identify regions and/or objects in the image data 304, including but not limited to: driveable surfaces (e.g., road surfaces that are unoccupied by an object or obstacle), ground, vehicles, pedestrians, buildings, sidewalks, vegetation, lamp posts, mailboxes, and the like. In some instances, the operation 318 can include segmenting the image data 304 using a machine learning algorithm trained to segment and/or classify objects in the image data 304.

At operation 320, the process can include determining an occupancy of one or more occlusion fields based at least in part on projecting the one or more occlusion fields into the segmented image data. For example, segmented image data with projected map data 322 illustrates the occlusion grid 314 and the occlusion fields 316 and 326 projected into the image data 304. As further illustrated, the segmented image data with projected map data 322 (also referred to as the data 322) includes segmented obstacles 308', 310', and 312', which correspond to the obstacles 308, 310, and 312, respectively. Because the occlusion field 326 projects onto the obstacle 312', which can be determined to be a vehicle (e.g., via the semantic segmentation), the operation 320 can determine that at least the occlusion field 326 is occupied by the obstacle 312'.

The operation 320 can use any algorithm to project the three-dimensional occlusion grid 314 and/or the occlusion field 316 into the image data 304. In one example, if the occlusion field 316 projects into a region labeled as a driveable surface, the operation 320 can determine that the occlusion field 316 represents an unoccupied field. In some examples, as the occlusion field 326 projects into the object 312', the operation 320 can determine that the occlusion field 326 is occupied. In at least some examples, addition occlusion fields may correspond to an occlusion state which is indeterminate. In other words, because the image of an object effectively blocks some of the occlusion fields, it may be impossible to state whether the occlusion field is occupied or not. Regardless, in any of the examples described herein, an indeterminate state may be treated as an occluded state for the purposes of safety.

At operation 324, the process can include commanding an autonomous vehicle (e.g., the vehicle 102) based at least in part on the occupancy. For example, when the vehicle 102 determines that the occlusion field 316 is unoccupied (and that all occlusion fields of the occlusion grid 314 are unoccupied), the vehicle 102 can be controlled to follow a trajectory to traverse the intersection 110. In some examples, when the occlusion field 326 is occupied, indeterminate, and/or when threshold number of occlusion fields of the occlusion grid 314 are occupied by an object, the operation 324 can include controlling the autonomous vehicle (e.g., the vehicle 102) to wait without traversing the intersection 110. In some examples, where a sufficiency of information is below a threshold value (e.g., a number of occupied or indeterminate occlusion fields meets or exceeds a threshold value and/or the number of occluded and non-visible occlusion fields meet or exceed some threshold such that a planner is unable to determine a safe trajectory to navigate the area), the operation 324 can include commanding the vehicle 102 to creep forward or otherwise change a location of the vehicle 102 to gather additional information.

In some examples, a sufficiency of information can correspond to determining a number of occlusion fields that are unoccupied meets or exceeds a threshold number and/or the number of visible occlusion fields meets or exceeds a certain number (e.g. enough to surpass a certain threshold for safely planning a trajectory to cross the region). In some instances, a sufficiency of information can include observing an indeterminate occlusion field for a period of time to increase a confidence level that the occlusion field is unoccupied. In some instances, a sufficiency of information can include determining an extent of an un-occluded and unoccupied region relative to a distance of an intersection for an autonomous vehicle to travel and/or relative to a velocity, acceleration, and/or time for the autonomous vehicle to traverse a portion of the intersection.

In some instances, the processes 200 and 300 can be performed in parallel (e.g., substantially simultaneously) and the outputs of each process can be compared to increase an overall confidence level about the states of one or more occlusion fields and/or about the states of an occlusion grid. In some instances, LIDAR data can be used to determine states of occlusion fields that are within a threshold distance to the vehicle 102, while the image data can be used to determine states of occlusion fields that meet or exceed a threshold distance from the vehicle 102. Of course, the examples described herein are not intended to be limiting, and other implementations are considered within the scope of the disclosure.

Figure 4:
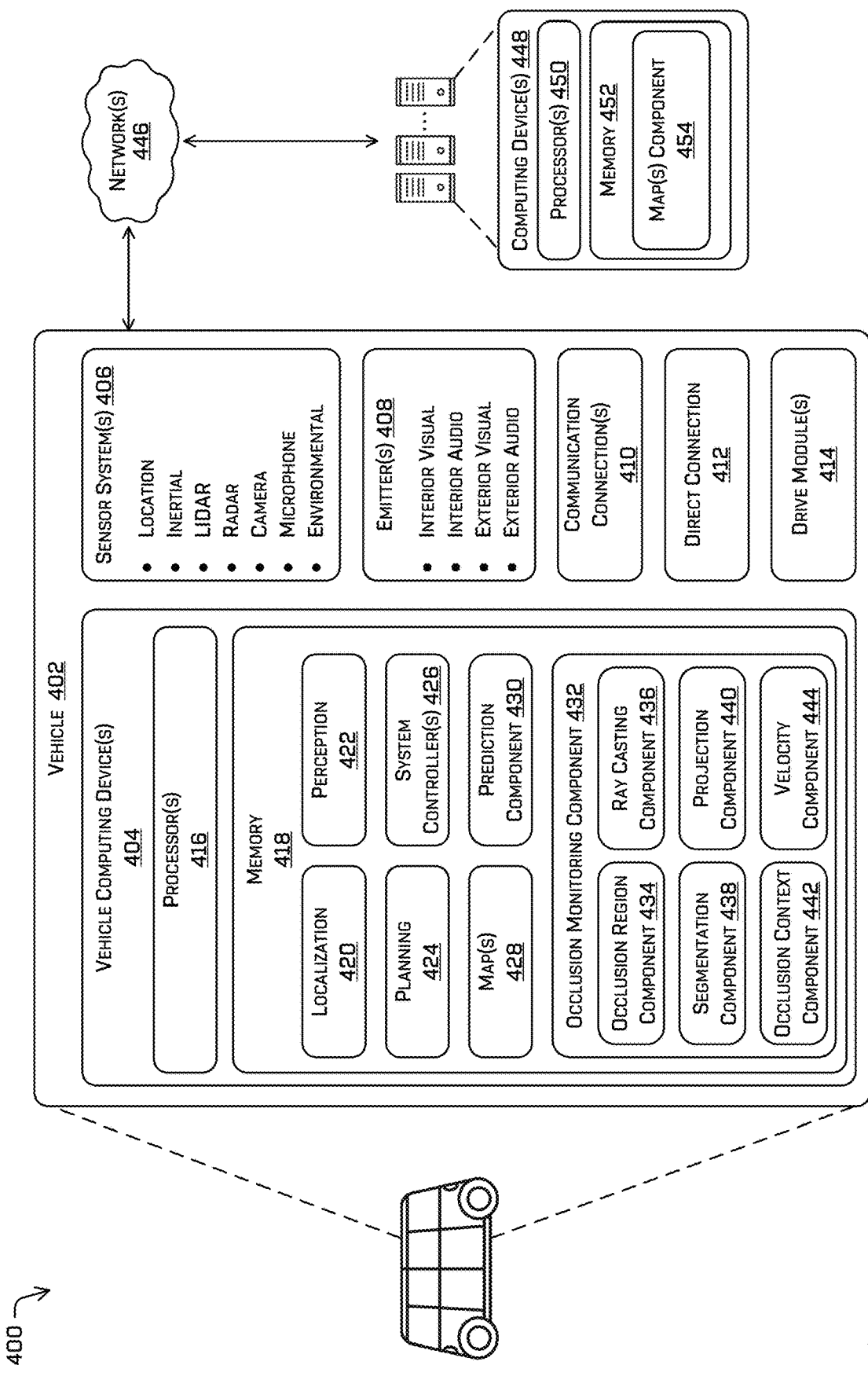
FIG. 4 depicts a block diagram of an example system for implementing the techniques described herein.

FIG. 4 depicts a block diagram of an example system 400 for implementing the techniques described herein. In at least one example, the system 400 can include a vehicle 402, which can correspond to the vehicle 102 in FIG. 1.

The vehicle 402 can include a vehicle computing device 404, one or more sensor systems 406, one or more emitters 408, one or more communication connections 410, at least one direct connection 412, and one or more drive modules 414.

The vehicle computing device 404 can include one or more processors 416 and memory 418 communicatively coupled with the one or more processors 416. In the illustrated example, the vehicle 402 is an autonomous vehicle; however, the vehicle 402 could be any other type of vehicle, or any other system having at least an image capture device (e.g., a camera enabled smartphone). In the illustrated example, the memory 418 of the vehicle computing device 404 stores a localization component 420, a perception component 422, a planning component 424, one or more system controllers 426, one or more maps 428 a prediction component 430, an occlusion monitoring component 432, an occlusion region component 434, a ray casting component 436, a segmentation component 438, a projection component 440, an occlusion context component 442, and a velocity component 444. Though depicted in FIG. 4 as residing in the memory 418 for illustrative purposes, it is contemplated that the localization component 420, the perception component 422, the planning component 424, the one or more system controllers 426, the one or more maps 428, the prediction component 430, the occlusion monitoring component 432, the occlusion region component 434, the ray casting component 436, the segmentation component 438, the projection component 440, the occlusion context component 442, and the velocity component 444 can additionally, or alternatively, be accessible to the vehicle 402 (e.g., stored on, or otherwise accessible by, memory remote from the vehicle 402). In some instances, the vehicle computing device(s) 404 can correspond to the vehicle computing device(s) 106 of FIG. 1.

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory and/or for determining to retrieve map data including an occlusion grid from memory, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, animal, building, tree, road surface, curb, sidewalk, unknown, etc.). In additional and/or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 422 can operate in conjunction with the segmentation component 438 to segment image data, as discussed herein.

In general, the planning component 424 can determine a path for the vehicle 402 to follow to traverse through an environment. For example, the planning component 424 can determine various routes and trajectories and various levels of detail. For example, the planning component 424 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 424 can generate an instruction for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In some instances, the planning component 424 can generate one or more trajectories for the vehicle 402 based at least in part on states of occlusion field(s) and/or occlusion grids, as discussed herein. In some examples, the planning component 424 can use temporal logic, such as linear temporal logic and/or signal temporal logic, to evaluate one or more trajectories of the vehicle 402. Details of utilizing temporal logic in the planning component 424 are discussed in U.S. application Ser. No. 15/632,147, which is herein incorporated by reference, in its entirety.

In at least one example, the vehicle computing device 404 can include one or more system controllers 426, which can be configured to control steering, propulsion, braking, safety, emitters, communication, and other systems of the vehicle 402. These system controller(s) 426 can communicate with and/or control corresponding systems of the drive module(s) 414 and/or other components of the vehicle 402.

The memory 418 can further include one or more maps 428 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 428 can include at least one map (e.g., images and/or a mesh). In some examples, the vehicle 402 can be controlled based at least in part on the maps 428. That is, the maps 428 can be used in connection with the localization component 420, the perception component 422, and/or the planning component 424 to determine a location of the vehicle 402, identify objects in an environment, and/or generate routes and/or trajectories to navigate within an environment.

In some examples, the one or more maps 428 can be stored on a remote computing device(s) (such as the computing device(s) 448) accessible via network(s) 446. In some examples, multiple maps 428 can be stored based on, for example, a characteristic (e.g., type of entity, time of day, day of week, season of the year, etc.). Storing multiple maps 428 can have similar memory requirements, but increase the speed at which data in a map can be accessed.

In some examples, the one or more maps 428 can store occlusion grids associated with individual locations in an environment. For example, as the vehicle 402 traverses the environment and as maps representing an area proximate to the vehicle 402 are loaded into memory, one or more occlusion grids associated with a location can be loaded into memory as well.

In some examples, the prediction component 430 can include functionality to generate predicted trajectories of objects in an environment. For example, the prediction component 430 can generate one or more predicted trajectories for vehicles, pedestrians, animals, and the like within a threshold distance from the vehicle 402. In some instances, and as discussed in connection with FIG. 8, the prediction component 430 can measure a trace of an object and generate a trajectory for the object when the object enters an occlusion region in an environment. Thus, even in a case where an object is not visible to one or more sensors of the vehicle 402, the prediction component 430 can extend a trajectory of the object in memory so as to maintain data about the object even if the object is not captured in sensor data.

In general, the occlusion monitoring component 432 can include functionality to generate and/or access occlusion grid data, determine occluded and un-occluded regions of an occlusion grid, and to determine occlusion states and/or occupancy states for occlusion fields of an occlusion grid. In some instances, the occlusion monitoring component 432 can correspond to the occlusion monitoring component 108 of FIG. 1. As discussed herein, the occlusion monitoring component 432 can receive LIDAR data, image data, map data, and the like to determine occlusion-related information in an environment. In some instances, the occlusion monitoring component 432 can provide occlusion information to the planning component 424 to determine when to control the vehicle 402 to traverse an environment. occlusion monitoring component 432 can provide occlusion information to the prediction component 430 to generate predicted trajectories for one or more objects in an occlusion region in an environment. Additional details of the occlusion monitoring component 432 are discussed in connection with the remaining components stored in the memory 418.

The occlusion region component 434 can include functionality to determine a portion of an occlusion grid that is occluded (e.g., similar to the occluded region 126 of FIG. 1) and to determine a portion of the occlusion grid that is un-occluded (e.g., similar to the un-occluded region 124 of FIG. 1). For example, the occlusion region component 434 can receive LIDAR data, image data, RADAR data, and the like to determine whether a region is "visible" to one or more sensors of the vehicle 402. In some instances, the occlusion region component 434 can include functionality to project sensor data into map data to determine regions of the map where no data is located. In some instances, the map data can be used to determine that there are regions "outside" the observable regions to determine regions that are occluded regions. In some instances, the occlusion region component 434 can dynamically generate an occluded region based on objects in an environment.

The ray casting component 436 can include functionality to receive LIDAR data and to ray cast the LIDAR data through the occlusion fields to determine an occlusion state and/or an occupancy state of a particular occlusion field. In some examples, the ray casting component 436 can determine an expected number of LIDAR returns associated with a particular occlusion field and can determine a number of actual LIDAR returns associated with a particular field. In some instances, the ray casting component 436 can determine a confidence level associated with the occlusion state and/or the occupancy state of an occlusion field, as discussed herein. As can be understood, the functionality discussed herein is not limited to LIDAR data, and can be used to determine an occlusion state and/or occupancy state using multiple sensor technologies (e.g., RADAR, SONAR, time-of-flight imagers, depth cameras, etc.).

The segmentation component 438 can include functionality to receive image data and to segment the image data to identity various objects and/or regions represented in the image data. For example, the segmentation component 438 can include one or more machine learning algorithms trained to identify and segment image data into semantic categories, including but not limited to, a driveable surface, free space (e.g., driveable surfaces) and/or non-free space, a vehicle, a pedestrian, a building, vegetation, and the like. In some instances, the segmentation component 438 can operate in conjunction with the perception component 422 to perform semantic segmentation on image data and/or on LIDAR data, for example.

The projection component 440 can include functionality to receive segmented image data and map data including an occlusion grid and occlusion field(s) and to project the occlusion field(s) into segmented image data. In some instances, the projection component 440 can determine an occupancy of one or more occlusion fields by determining whether the occlusion field projects into a driveable surface (e.g., a clear road), into an object (e.g., a vehicle) that would occupy the region, or otherwise indeterminate.

The occlusion context component 442 can include functionality to determine an occupancy of an occlusion grid, and especially an occluded region, based on the context of the environment. As can be understood, a portion of an occlusion grid can be occluded by an object such that the vehicle 402 may not capture sensor data of an occluded region. In some examples, the occlusion context component 442 can monitor a region that is physically before the occluded region (e.g., in terms of a direction of traffic flow) to determine whether objects enter the occluded region. Based on a size of the occluded region, and after a passage of time, the occlusion context component 442 can determine that an occluded region is not occupied if no objects have entered the occluded region. As a non-limiting example, such a context component 442 can determine the presence of a vehicle approaching an intersection of a two-lane road and, based on determining that no objects were detecting passing behind the occluded region, the context component 442 can determine that the occluded regions are unoccupied. In some instances, a confidence level associated with the determination of an occupancy state can increase over time (e.g., by accumulating additional observations). In some instances, for a dynamically generated occlusion grid, a lifetime of the occlusion grid can correspond to an amount of time since the occlusion grid was instantiated. In some instances, a confidence level of an occupancy state of an occlusion grid can be based at least in part on the lifetime of the occlusion grid. In some instances, the occlusion context component 442 can receive LIDAR data, image data, RADAR data, and the like to determine a context of an occluded region.

The velocity component 444 can include functionality to determine a velocity and/or an acceleration level for the vehicle 402 while traversing an environment. In some instances, the velocity and/or acceleration levels can include, but are not limited to, a low velocity (e.g., a "creep mode"), a normal velocity (e.g., a nominal velocity), and a high velocity (e.g., a "boost mode"). For example, a low velocity level can be selected for the vehicle 402 to enter an intersection or a region without traversing the entire intersection or region. For example, and as discussed in connection with FIG. 6, the vehicle 402 may be controlled to move slowly along a trajectory to "see" more of a region to reduce a size of an occluded region before progressing according to nominal controls. For such a trajectory, the velocity component 444 can select a low velocity. As another example, when an occlusion grid is clear, the normal velocity can be selected for the vehicle 402 to traverse an environment. In some cases, where a size of an occlusion grid is reduced due to obstacles and/or based on limited sightlines in the environment, a high velocity can be selected to reduce an amount of time the vehicle 402 can be exposed to oncoming traffic. In some instances, the velocity component 444 can operate in conjunction with the planning component 424 and/or the system controller(s) 426 to control the acceleration of the vehicle 402.

As can be understood, the components discussed herein (e.g., the localization component 420, the perception component 422, the planning component 424, the one or more system controllers 426, the one or more maps 428, the prediction component 430, the occlusion monitoring component 432, the occlusion region component 434, the ray casting component 436, the segmentation component 438, the projection component 440, the occlusion context component 442, and the velocity component 444) are described as divided for illustrative purposes. However, the operations performed by the various components can be combined or performed in any other component. By way of example, segmentation functions may be performed by the perception component 422 (e.g., rather than the segmentation component 438) to reduce the amount of data transferred by the system.

In some instances, aspects of some or all of the components discussed herein can include any models, algorithms, and/or machine learning algorithms. For example, in some instances, the components in the memory 418 (and the memory 452, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 406 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the LIDAR sensors can include individual LIDAR sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device 404. Additionally or alternatively, the sensor system(s) 406 can send sensor data, via the one or more networks 446, to the one or more computing device(s) at a particular frequency, after a lapse of a predetermined period of time, in near real-time, etc. In some instances, the sensor system(s) 406 can correspond to the sensor system(s) 104 of FIG. 1.

The vehicle 402 can also include one or more emitters 408 for emitting light and/or sound, as described above. The emitters 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive module(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device 404 to another computing device or a network, such as network(s) 446. For example, the communications connection(s) 410 can enable Wi-Fi-based communication such as via frequencies defined by the IEEE 802.11 standards, short range wireless frequencies such as Bluetooth®, cellular communication (e.g., 2G, 4G, 4G, 4G LTE, 5G, etc.) or any suitable wired or wireless communications protocol that enables the respective computing device to interface with the other computing device(s).

In at least one example, the vehicle 402 can include one or more drive modules 414. In some examples, the vehicle 402 can have a single drive module 414. In at least one example, if the vehicle 402 has multiple drive modules 414, individual drive modules 414 can be positioned on opposite ends of the vehicle 402 (e.g., the front and the rear, etc.). In at least one example, the drive module(s) 414 can include one or more sensor systems to detect conditions of the drive module(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 414. In some cases, the sensor system(s) on the drive module(s) 414 can overlap or supplement corresponding systems of the vehicle 402 (e.g., sensor system(s) 406).

The drive module(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage j unction, a high voltage cable, charging system, charge port, etc.). Additionally, the drive module(s) 414 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 414. Furthermore, the drive module(s) 414 also include one or more communication connection(s) that enable communication by the respective drive module with one or more other local or remote computing device(s).

In at least one example, the direct connection 412 can provide a physical interface to couple the one or more drive module(s) 414 with the body of the vehicle 402. For example, the direction connection 412 can allow the transfer of energy, fluids, air, data, etc. between the drive module(s) 414 and the vehicle. In some instances, the direct connection 412 can further releasably secure the drive module(s) 414 to the body of the vehicle 402.

In at least one example, the localization component 420, the perception component 422, the planning component 424, the one or more system controllers 426, the one or more maps 428, the prediction component 430, the occlusion monitoring component 432, the occlusion region component 434, the ray casting component 436, the segmentation component 438, the projection component 440, the occlusion context component 442, and the velocity component 444 can process sensor data, as described above, and can send their respective outputs, over the one or more network(s) 446, to one or more computing device(s) 448. In at least one example, the localization component 420, the perception component 422, the planning component 424, the one or more system controllers 426, the one or more maps 428, the prediction component 430, the occlusion monitoring component 432, the occlusion region component 434, the ray casting component 436, the segmentation component 438, the projection component 440, the occlusion context component 442, and the velocity component 444 can send their respective outputs to the one or more computing device(s) 448 at a particular frequency, after a lapse of a predetermined period of time, in near real-time, etc.

In some examples, the vehicle 402 can send sensor data to one or more computing device(s) 448 via the network(s) 446. In some examples, the vehicle 402 can send raw sensor data to the computing device(s) 448. In other examples, the vehicle 402 can send processed sensor data and/or representations of sensor data to the computing device(s) 448. In some examples, the vehicle 402 can send sensor data to the computing device(s) 448 at a particular frequency, after a lapse of a predetermined period of time, in near real-time, etc. In some cases, the vehicle 402 can send sensor data (raw or processed) to the computing device(s) 448 as one or more log files.

The computing device(s) 448 can include processor(s) 450 and a memory 452 storing a maps(s) component 454.

In some instances, the map(s) component 454 can include functionality to associate occlusion grid(s) with map locations. In some instances, the map(s) component 454 can identify intersections where a vehicle approaching the intersection does not have a right of way, for example, and can generate an occlusion grid for that location. In some instances, the map(s) component 454 can identify topographic occlusion regions caused by a crest of a hill, for example, that may reduce a visibility of the vehicle 402. In some instances, and as discussed in connection with FIG. 5, for example, a size of the occlusion grid can be based at least in part on region characteristics such as a distance of an intersection, a speed limit, a speed limit safety factor, and the like.

The processor(s) 416 of the vehicle 402 and the processor(s) 450 of the computing device(s) 448 can be any suitable processor capable of executing instructions to process data and perform operations as described herein. By way of example and not limitation, the processor(s) 416 and 450 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 452 are examples of non-transitory computer-readable media. The memory 418 and 452 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 448 and/or components of the computing device(s) 448 can be associated with the vehicle 402. That is, the vehicle 402 can perform one or more of the functions associated with the computing device(s) 448, and vice versa. Further, aspects of the occlusion monitoring component 432 and/or the prediction component 430 can be performed on any of the devices discussed herein.

FIGS. 2, 3, and 5-11 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
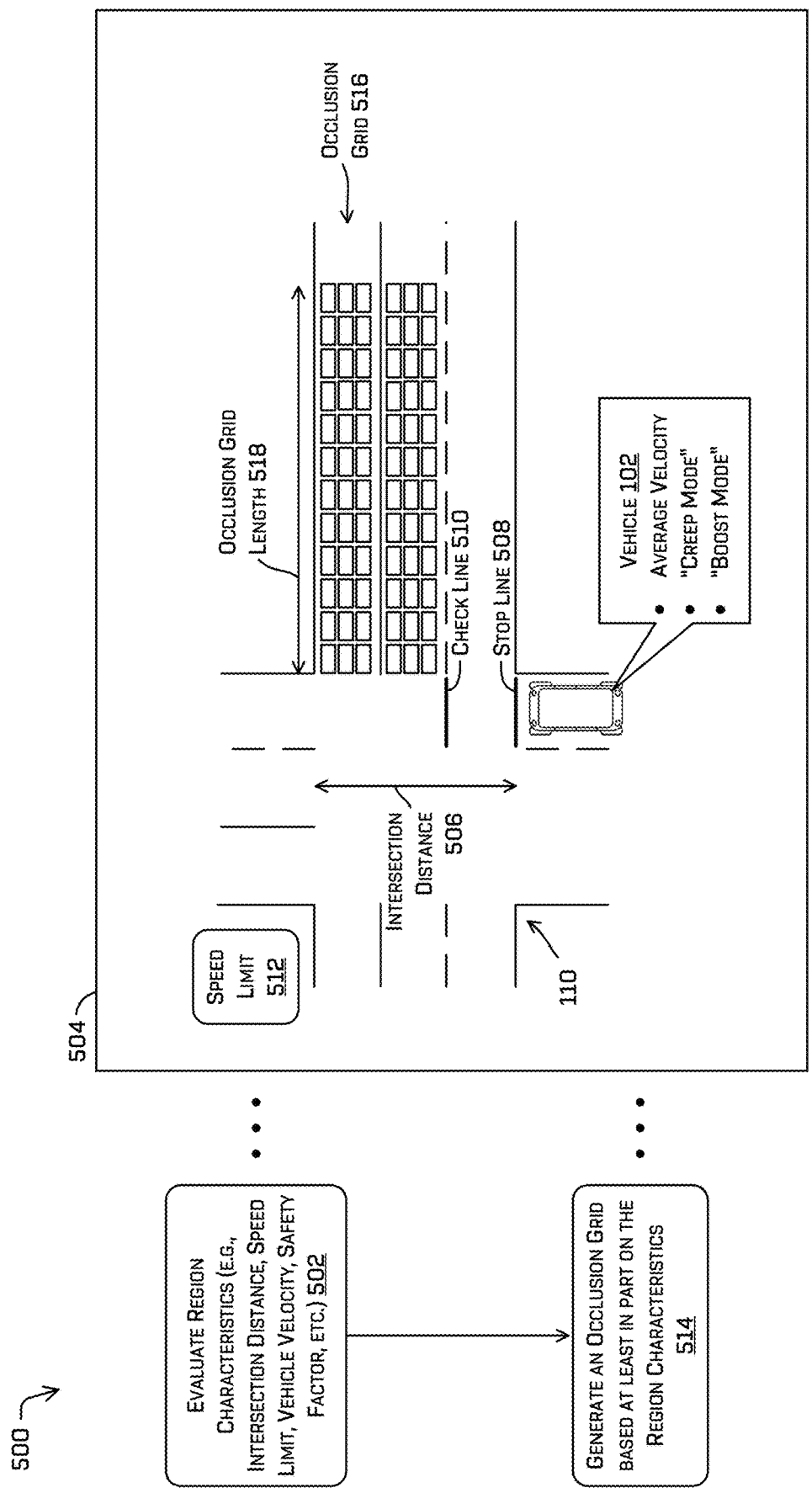
FIG. 5 is a pictorial flow diagram of an example process for generating an occlusion grid based on region characteristics, in accordance with embodiments of the disclosure.

FIG. 5 is a pictorial flow diagram of an example process 500 for generating an occlusion grid based on region characteristics, in accordance with embodiments of the disclosure. For example, some or all of the process 500 can be performed by one or more components in FIG. 4, as described herein.

At operation 502, the process can include evaluating region characteristics. In some examples, the region characteristics can include, but are not limited to, an intersection (or region) distance (e.g., a width of an intersection to be crossed), a speed limit, a vehicle velocity, a safety factor, and the like. An example 504 illustrates region characteristics for the intersection 110. For example, the intersection 110 is associated with an intersection distance 506, which represents a distance between a stop line 508 of the intersection 110 and a location associated with exiting the intersection 110. In some examples, the vehicle 102 may not remain static in the intersection 110 when attempting to cross the intersection, and accordingly, the vehicle 102 may be controlled to navigate to a check line 510. In some examples, the check line 510 can represent the furthest into the intersection 110 that the vehicle 102 can navigate without interrupting the flow of traffic. That is, beyond the check line 510, the vehicle 102 may be in the way of oncoming traffic. In a case where the vehicle 102 moves to the check line 510, the intersection distance 506 can be updated to reflect the reduced distance of the intersection 110 to be traversed by the vehicle 102. In some instances, the stop line 508 and/or the check line 510 can be stored as map data or generated dynamically based on sensor data captured in an environment.

The intersection 110 may also be associated with a speed limit 512. As can be understood, a safety factor can be associated with the speed limit 512 that effectively raises the speed vehicles traversing the intersection 110 are expected to reach. For example, in an intersection where the speed limit 512 is 25 miles per hour, the safety factor may be an additional 15 miles per hour. That is to say, at least some vehicles which traverse the intersection 110 are presumed to be speeding. Such a safety factor accounts for this assumption.

The example 504 also illustrates the vehicle 102 associated with an average velocity, a "creep mode," and a "boost mode." As can be understood, the average velocity can be an expected average velocity for the vehicle 102 to traverse the intersection distance 506. Additionally, the vehicle 102 can be associated with various acceleration levels to slowly or quickly traverse at least a portion of the intersection 110.

At operation 514, the process can include generating an occlusion grid based at least in part on the region characteristics. In the example 504, an occlusion grid is generated and associated with the intersection 110. In some examples, the occlusion grid 516 can be associated with an occlusion grid length 518 (or more generally, an extent (e.g., length, width, height) of the occlusion grid 516). By way of example, and without limitation, the occlusion grid length 518 can be sized such that the vehicle 102 traversing the intersection 110 associated with the intersection distance 506 at an average velocity of the vehicle 102 cannot be intersected by a vehicle traveling at the speed limit 512 (plus a safety factor) if the occlusion grid 516 is clear when the vehicle 102 initiates its trajectory. That is, the occlusion grid length 518 is sized to allow the vehicle 102 to safely traverse the intersection 110 when the occlusion grid 516 is clear. As can be understood, generating the occlusion grid 516 based at least in part on the region characteristics improves safety outcomes without allocating additional resources to the operations than are required to ensure safe travel.

In some instances, a length of a visible region associated with an intersection may be restricted or limited due to the geography of the intersection. For example, a road prior to an intersection may include a hairpin turn or other obstruction that reduces a size of a region that can be sensed by the vehicle 102. In some instances, geographic and/or topographic information about the intersection (e.g., the maximum visible distance) can be used to set a size of the occlusion grid 516 to avoid a scenario where the vehicle 102 expects a clear region beyond what is physically possible. Accordingly, a velocity and/or acceleration of the vehicle can be set to ensure that the vehicle can safely traverse such an intersection. Similarly, a threshold associated with a size of an un-occluded region or a threshold associated with indeterminate occupancy states can be adjusted based on a size of the region to be sensed, as discussed herein.

Figure 6:
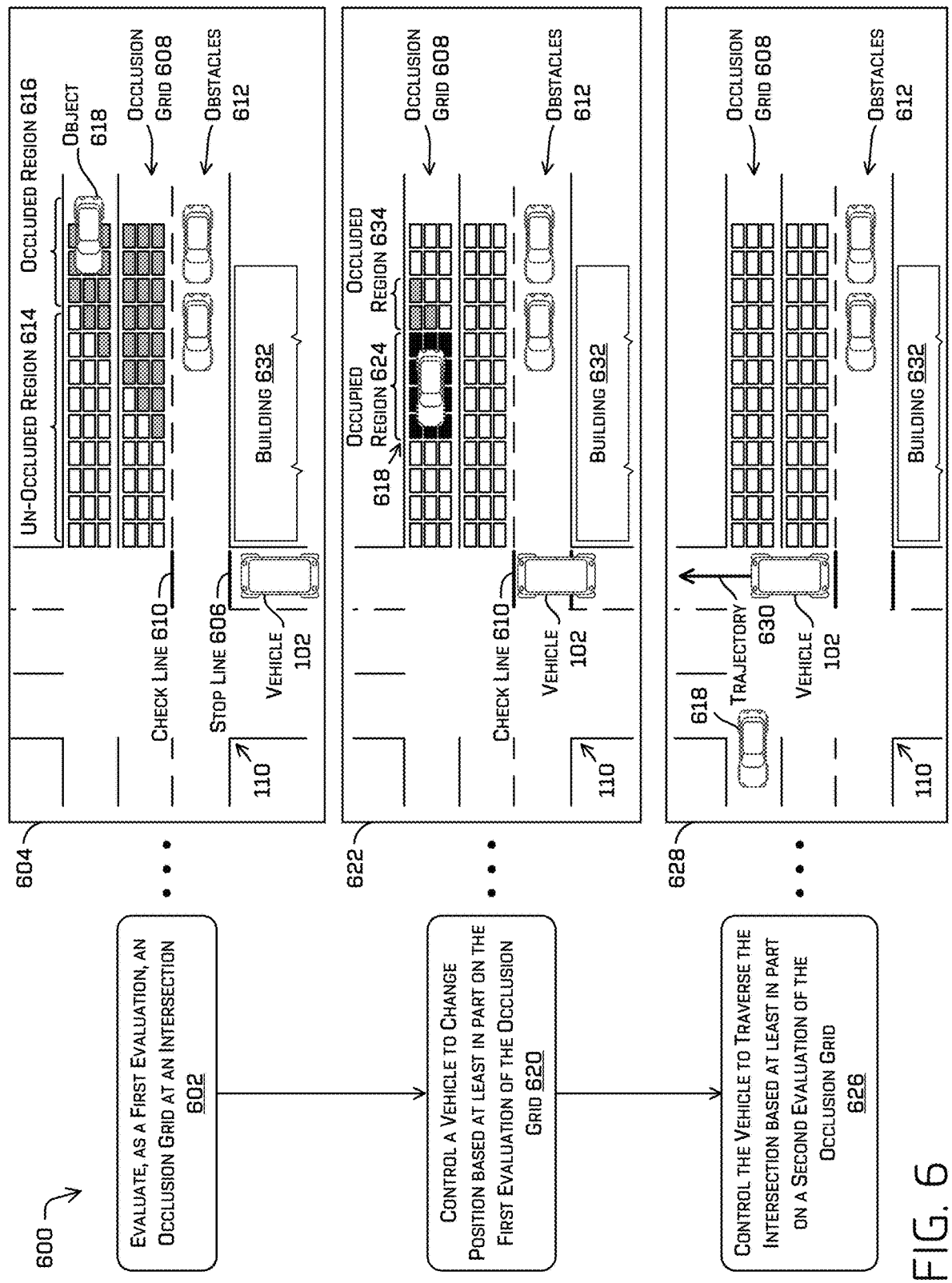
FIG. 6 is a pictorial flow diagram of an example process for evaluating an occlusion grid at an intersection and controlling a vehicle to traverse the intersection, in accordance with embodiments of the disclosure.

FIG. 6 is a pictorial flow diagram of an example process 600 for evaluating an occlusion grid at an intersection and controlling a vehicle to traverse the intersection, in accordance with embodiments of the disclosure. For example, some or all of the process 600 can be performed by one or more components in FIG. 4, as described herein.

At operation 602, the process can include evaluating an occlusion grid at an intersection. In an example 604, the vehicle 102 is illustrated in the intersection 110 at a stop line 606. Based at least in part on map data associated with the intersection 110, the vehicle 102 can load into memory an occlusion grid 608. Additionally, the vehicle 102 can determine the stop line 606 based on map data or can generate the stop line 606 based on identifying the stop line 606 in the environment. Additionally, a check line 610 can be accessed from memory or determined based on identifying a shoulder or protected region of the intersection 110.

In some instances, due to the location of the vehicle 102 with respect to one or more obstacles 612 (here a row of parked cars) and a building 632, the vehicle 102 can associate an un-occluded region 614 with a portion of the occlusion grid 608 and can associate an occluded region 616 with a portion of the occlusion grid 608. As illustrated, individual occlusion fields of the occlusion grid corresponding to the occluded region 616 are shaded as gray, while the un-occluded region 614 is unshaded. As can be understood, an object 618 can occupy the occluded region 616, but because the vehicle 102 may not receive sensor data associated with the occluded region 616, the vehicle 102 would not know about the presence of the object 618 (e.g., the corresponding occupancy state may be indeterminate).

In some instances, the operation 602 can include determining that the occlusion fields in the un-occluded region 614 are visible and unoccupied, while the occlusion fields in the occluded region 616 are not visible and the occupancy state is unknown (e.g., indeterminate). In some instances, a default state for an occlusion field in the occluded region 616 can be an occupied state (or an indeterminate state to be treated as an occupied state).

At operation 620, the process can include controlling a vehicle to change position based at least in part on the first evaluation of the occlusion grid (e.g., a determination that there is not enough information to safely traverse the intersection). In an example 622, the vehicle 102 can be controlled to move from the stop line 606 to the check line 610 to increase a size of the un-occluded region 614 of the occlusion grid 608 (e.g., by increasing the amount of data available from sensors of the vehicle 102), and accordingly, to reduce a size of the occluded region 616 of the occlusion grid 608. As illustrated in the example 622, a majority of the occlusion grid 608 is un-occluded to the vehicle 102, although the vehicle 102 can now identify the object 618 in the occlusion grid 608. Accordingly, occlusion fields of the occlusion grid 608 that correspond to the object 618 are identified as an occupied region 624 (and, for the purposes of illustration, are shaded in black). Similarly, the object 618 can generate a "shadow" with respect to the sensed region of the vehicle 102, illustrated by the occluded region 634 (and as shaded gray in the example 622). Accordingly, the vehicle 102 can be controlled to wait at the check line 610 without further entering the intersection 110. In some examples, the vehicle 102 can be controlled to advance slowly (e.g. under a threshold speed) to the check line 610 (e.g., a "creep mode"), although any acceleration and/or velocity can be used.

At operation 626, the process can include controlling the vehicle to traverse the intersection based at least in part on a second evaluation of the occlusion grid. In an example 628, the object 618 has exited the occlusion grid 608, which is now visible and unoccupied. Accordingly, the vehicle 102 is illustrated as traversing the intersection 110 based at least in part on a trajectory 630. In some examples, the vehicle 102 can be controlled to accelerate through the intersection 110 using a normal or high acceleration (e.g., a "boost mode"), although any acceleration can be used.

In some instances, the operations 602, 620, and/or 626 can be performed continuously by the vehicle 102 to monitor a state of the environment over time. In some instances, the process 600 can include evaluating the occlusion grid at a frequency of 10 Hertz (Hz) (or any frequency) to continuously evaluate the environment.

Figure 7:
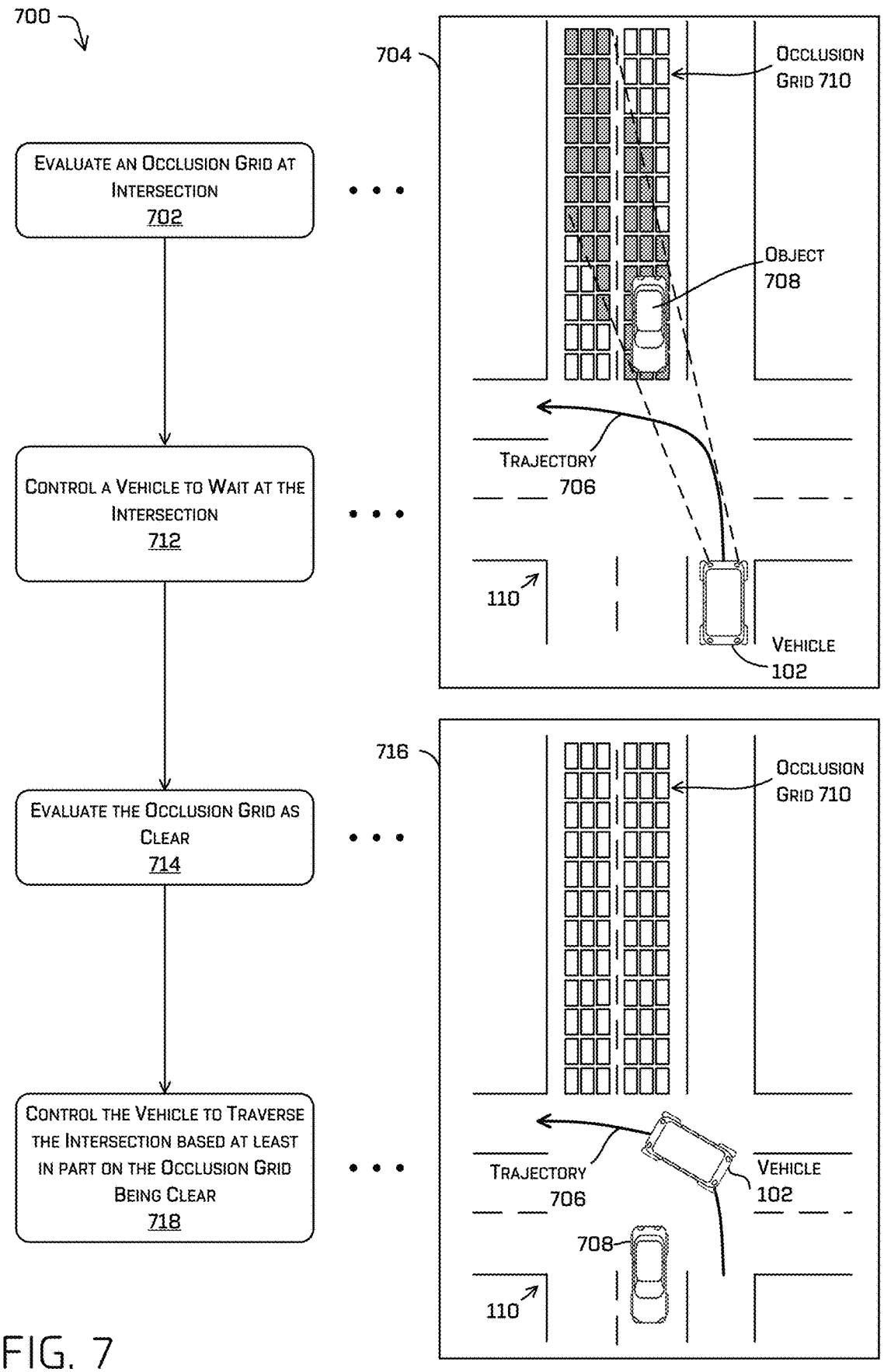
FIG. 7 is a pictorial flow diagram of another example process for evaluating an occlusion grid at an intersection and controlling a vehicle to traverse the intersection, in accordance with embodiments of the disclosure.

FIG. 7 is a pictorial flow diagram of another example process 700 for evaluating an occlusion grid at an intersection and controlling a vehicle to traverse the intersection, in accordance with embodiments of the disclosure. For example, some or all of the process 700 can be performed by one or more components in FIG. 4, as described herein.

At operation 702, the process can include evaluating an occlusion grid at an intersection. In some examples, the operation 702 can include generating an occlusion grid in response to identifying an obstacle in an environment. In an example 704, a vehicle 102 is at the intersection 110 attempting to follow a trajectory 706, such as executing an unprotected left turn (e.g., the vehicle 102 does not have a green arrow and must yield to oncoming traffic). In some instances, the vehicle 102 can identify an object 708 (e.g., a vehicle) in the environment and can associate an occlusion grid 710 with the object 708. As discussed herein, the vehicle can receive LIDAR data and/or image data to evaluate the occlusion state and/or occupancy state of occlusion fields in the occlusion grid 710.

At operation 712, the process can include controlling the vehicle 102 to wait at the intersection. As can be understood, the vehicle 102 can be controlled to wait at the intersection 110 based at least in part on a portion of the occlusion grid 710 being occluded, the occlusion grid 710 providing an insufficient amount of information for safely traversing the intersection 110, and/or based at least in part on the object 708 traversing the intersection 110.

At operation 714, the process can include evaluating the occlusion grid as clear (or as otherwise providing sufficient information to enable a safe traversal of the intersection 110 according to the trajectory 706). In an example 716, the object 708 is illustrated as having navigated out of the occlusion grid 710 across the intersection 110. In some examples, the operation 714 can include capturing LIDAR data and/or image data to determine that the occlusion fields are visible and not occupied (or otherwise indeterminate), and that accordingly, the occlusion grid 710 is clear (or provides sufficient information).

At operation 718, the process can include controlling the vehicle 102 to traverse the intersection based at least in part on the occlusion grid being clear. In some instances, the operation 718 can include waiting for a predetermined amount of time (e.g., 1 second, 2 seconds, etc.) for the occlusion grid 710 to be clear (or provide a sufficient amount of information to determine a safe traversal of trajectory 706) prior to instructing the vehicle 102 to traverse the environment. As illustrated in the example 716, the vehicle 102 is traversing the intersection 110 via the trajectory 706. Further, the occlusion grid 710 is illustrated as being visible and clear from obstacles.

Figure 8:
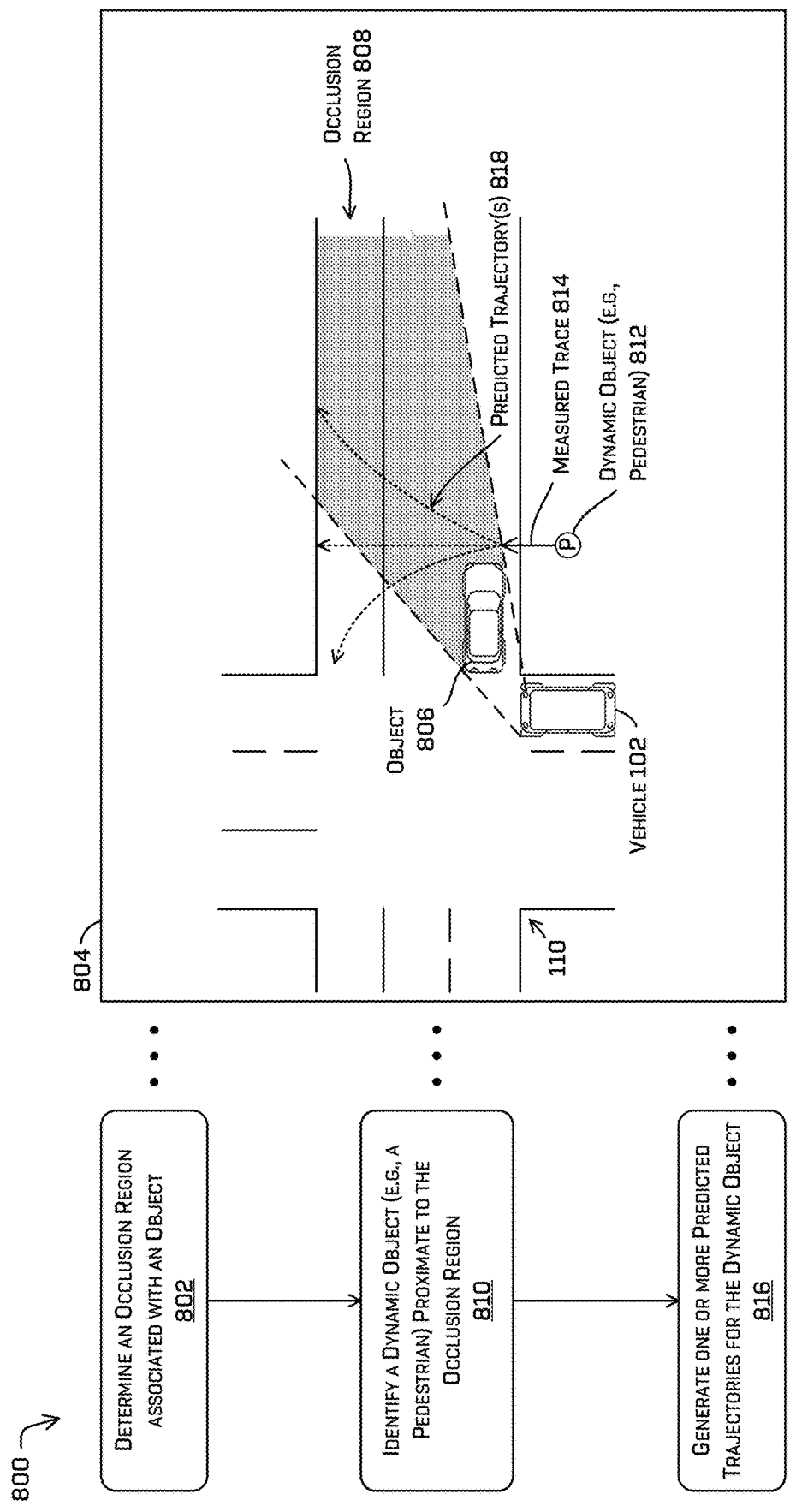
FIG. 8 is a pictorial flow diagram of an example process for determining an occlusion region associated with an object and for generating predicted trajectories for dynamic object(s) in the occlusion region, in accordance with embodiments of the disclosure.

FIG. 8 is a pictorial flow diagram of an example process 800 for determining an occlusion region associated with an object and for generating predicted trajectories for dynamic object(s) in the occlusion region, in accordance with embodiments of the disclosure. For example, some or all of the process 800 can be performed by one or more components in FIG. 4, as described herein. For example, some or all of the process 800 can be performed by the vehicle computing device(s) 404.

At operation 802, the process can include determining an occlusion region associated with an object. In an example 804, the vehicle 102 at the intersection 110 captures LIDAR data and/or image data of the environment. In some examples, the operation 802 can include identifying an object 806 in the environment and an occlusion region 808 associated with the object 806. In the example 804, the object 806 can represent a car parked near the intersection 110. In some instances, the operation 802 can include generating an occlusion grid (not shown) associated with the object 806. In some instances, the occlusion region 808 represents an occluded portion of an occlusion grid. In some instances, the operation 802 can include accessing map data including an occlusion grid, as discussed herein.

At operation 810, the process can include identifying a dynamic object (e.g., a pedestrian) proximate to the occlusion region 808. In some instances, the operation 810 can include determining that a dynamic object (e.g., a pedestrian) 812 is within a threshold distance of the occlusion region 808. In some instances, the operation 810 can include receiving LIDAR data, image data, and/or other sensor data to measure, as a measured trace 814, a trajectory (e.g., positions, orientations, and velocities) of the dynamic object 812 in the environment.

At operation 816, the process can include generating one or more predicted trajectories for the dynamic object. In the example 804, one or more predicted trajectories 818 are illustrated as possible paths for the pedestrian 812 to follow while in the occlusion region 808 (although the predicted trajectories are not limited to the occlusion region 808). In some examples, the predicted trajectories 818 can be based at least in part on the measured trace 814 and/or symbols or regions in the environment. For example, a predicted trajectory may include a continuation of the speed and direction of the pedestrian 812 as the pedestrian entered the occlusion region 808. In another example, a predicted trajectory may be based on a destination of the environment, such as a sidewalk on the opposite side of the intersection. Predicted trajectories can be generated using a variety of methods. Details of generating predicted trajectories are discussed in U.S. application Ser. No. 15/833,715, which is herein incorporated by reference, in its entirety.

In some examples, the operation 816 can include controlling the vehicle 102 based at least in part on the one or more predicted trajectories 818. In some instances, if a trajectory of the vehicle 102 is within a threshold distance of at least one predicted trajectory, the vehicle 102 can be controlled to wait until additional information about the dynamic object can be determined. In some instances, as a period of time elapses, the vehicle 102 can increase or decrease a probability associated with individual predicted trajectories indicating a likelihood that the path of the pedestrian 812 follows one or more of the predicted trajectories 818. For example, as time progresses and an observation associated with the dynamic object 812 is or is not made, a trajectory can be rejected (e.g., pruned) from the possible list of predicted trajectories. In some instances, as the dynamic object 812 is observed in the environment, one or more predicted trajectories can be rejected if they do not describe or are not associated with the movement of the dynamic object 812 within the occlusion region 808.

Figure 9:
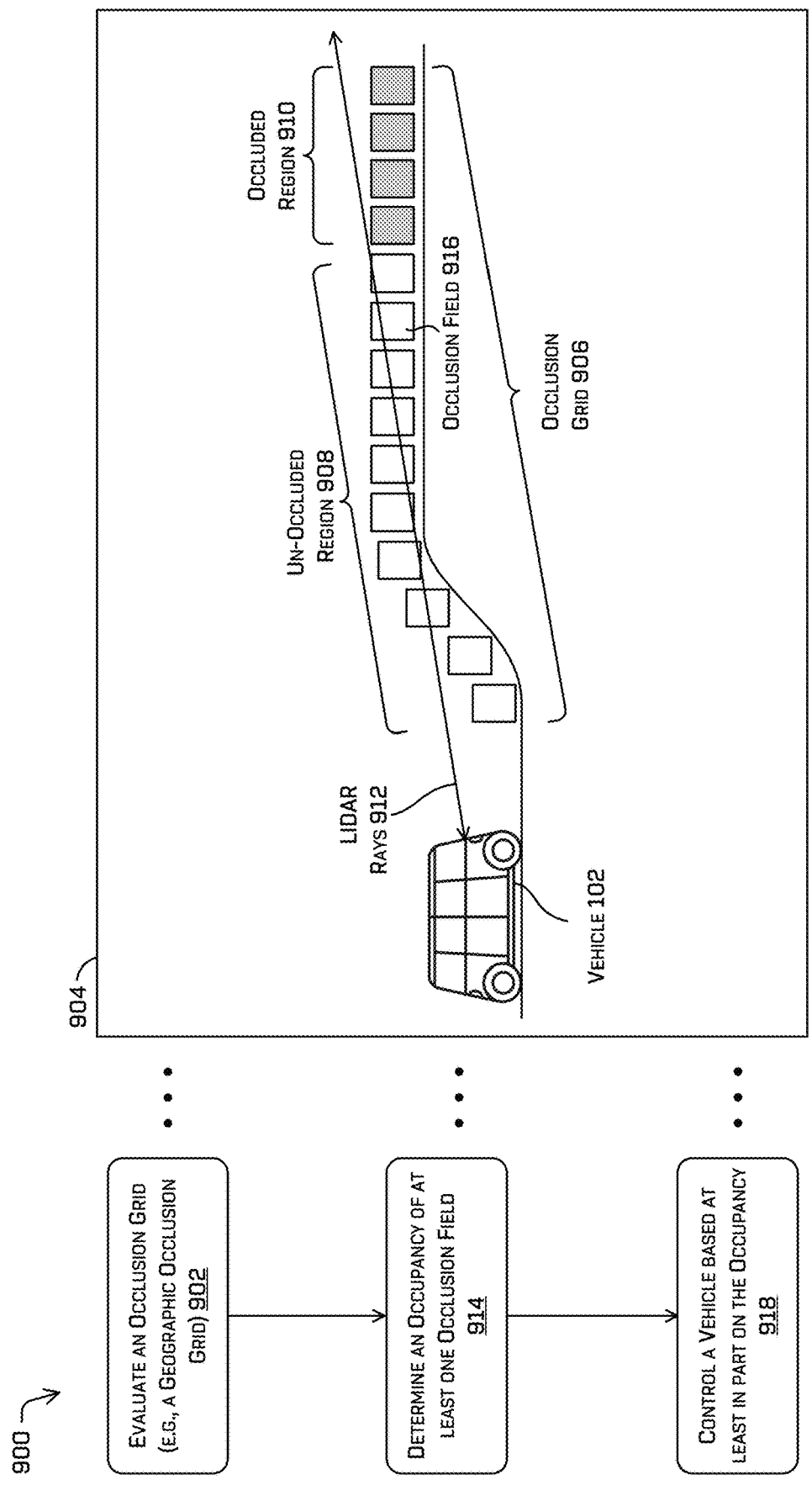
FIG. 9 is a pictorial flow diagram of an example process for evaluating a topographic occlusion grid and for controlling a vehicle to traverse a topographic obstacle, in accordance with embodiments of the disclosure.

FIG. 9 is a pictorial flow diagram of an example process 900 for evaluating a topographic occlusion grid and for controlling a vehicle to traverse a topographic obstacle, in accordance with embodiments of the disclosure. For example, some or all of the process 900 can be performed by one or more components in FIG. 4, as described herein. For example, some or all of the process 900 can be performed by the vehicle computing device(s) 404.

At operation 902, the process can include evaluating an occlusion grid. In some examples, the occlusion grid can be a topographic occlusion grid generated in response to topographic (e.g., geographic) features in an environment. In an example 904, an occlusion grid 906 is shown in connection with a crest of a hill. As can be understood, as the vehicle 102 approaches the hill, the crest of the hill naturally creates regions that are not visible to the vehicle 102 due to the height difference and angle of the ground. In one example, the occlusion grid 906 is associated with an un-occluded region 908 and an occluded region 910. As illustrated, the vehicle 102 emits LIDAR rays 912 that traverse through the occlusion grid 906 to identify the un-occluded region 908 and the occluded region 910.

As can be understood, as the vehicle 102 approaches the crest of a hill, the vehicle 102 may not be able to capture sensor data of the ground at the top of the hill. In some embodiments, this reduces the visibility of the vehicle 102, and accordingly, the vehicle 102 can reduce a speed of the vehicle 102 to navigate the environment.

However, at operation 914, the process can include determining an occupancy of at least one occlusion field. For example, the occlusion grid 906 includes at least one occlusion field 916. As illustrated in the example 904, the occlusion field 916 is located at the top of the hill such that the LIDAR rays 912 cannot capture sensor data of the ground associated with the occlusion field 916. In some instances, the occlusion grid 906 can be accessed via map data that includes topographical information (e.g., height information) of a region to indicate particular regions that would or would not be occluded. Further, such map information can indicate how many data points (e.g., LIDAR returns) above a surface can be expected based on a location of the vehicle 102, for example. However, because the occlusion field 916 comprises or is associated with a three-dimensional volume of space, the LIDAR rays 912 can traverse through a portion of the occlusion field 916. In some examples, based at least in part on ray casting the LIDAR rays 912, as discussed herein, the operation 914 can include determining the occupancy of the occlusion field 916. In this example, the occlusion field 916 is visible to the vehicle 102 (for the purpose of determining an occlusion state) and unoccupied by an obstacle.

At operation 918, the process can include controlling a vehicle (e.g., the vehicle 102) based at least in part on the occupancy. For example, by evaluating the occlusion grid 906 that represents a hill in the environment, the vehicle 102 can "see over" the crest of the hill despite the sensors not directly capturing ground data beyond the hill of the crest. Thus, the vehicle 102 can plan a trajectory and/or determine a velocity based on the occupancy of the occlusion grid 906 beyond the crest of the hill. As a non-limiting example, the vehicle 102 may adjust one or more of a velocity, orientation, or position such that information provided by the occlusion grid 906 is sufficient to safely traverse the hill.

Figure 10:
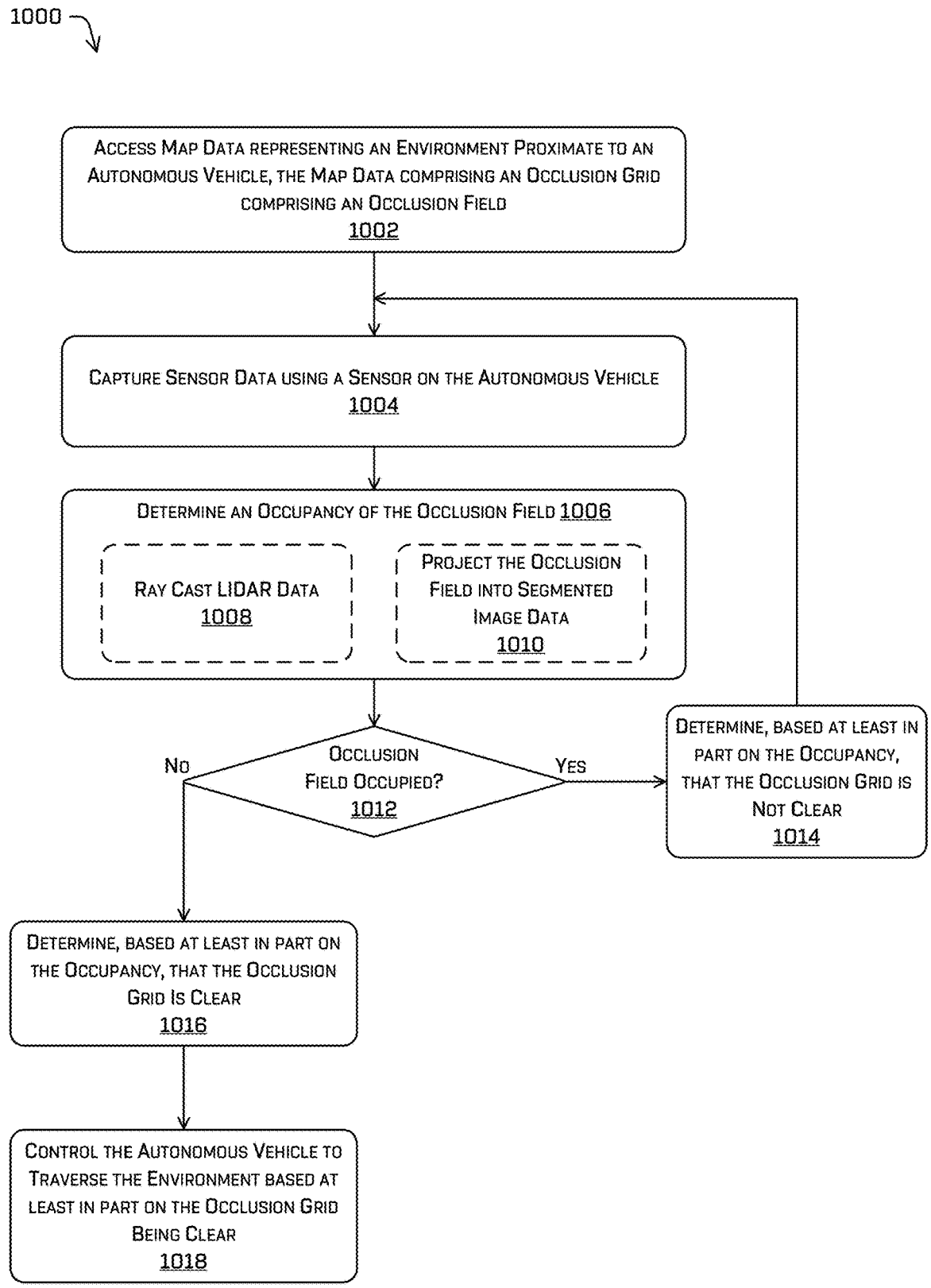
FIG. 10 depicts an example process for determining an occupancy of an occlusion field based on ray casting LIDAR data and/or based on projecting an occlusion field into image data, and controlling a vehicle to traverse an environment, in accordance with embodiments of the disclosure.

FIG. 10 depicts an example process for determining an occupancy of an occlusion field based on ray casting LIDAR data and/or based on projecting an occlusion field into image data, and controlling a vehicle to traverse an environment, in accordance with embodiments of the disclosure. For example, some or all of the process 1000 can be performed by one or more components in FIG. 4, as described herein. For example, some or all of the process 1000 can be performed by the vehicle computing device(s) 404.

At operation 1002, the process can include accessing map data representing an environment proximate to an autonomous vehicle, the map data comprising an occlusion grid comprising an occlusion field. In some instances, the operation 1002 can include determining a location of the vehicle in an environment and accessing map data that is within a threshold distance of the vehicle (e.g., a receding horizon). As discussed herein, in some instances, the occlusion grid can comprise a plurality of occlusion fields, with each occlusion field representing a discrete portion of the environment (e.g., part of a driveable surface). In some instances, the occlusion field can represent an occlusion state (e.g., whether the occlusion field is visible to the vehicle) and an occupancy state (e.g., whether the occlusion field is occupied by an object in the environment, or otherwise indeterminate).

At operation 1004, the process can include capturing sensor data using a sensor on the autonomous vehicle. In some instances, the operation 1004 can include capturing LIDAR data and/or image data of the environment.

At operation 1006, the process can include determining an occupancy of the occlusion field. In some examples, the operation 1006 can also include determining a visibility of the occlusion field. In some examples, the operation 1006 can include determining the occupancy of the occlusion field based at least in part on LIDAR data (e.g., operation 1008) and/or image data (e.g., operation 1010).

At operation 1008, the process can include ray casting the LIDAR data to determine an occupancy of the occlusion field. As discussed in connection with FIG. 2, and throughout this disclosure, ray casting the LIDAR data can include determining an expected number of LIDAR returns through the occlusion field (e.g., which may pass through voxels in a column of voxel space above the occlusion field) and determining an actual number of LIDAR returns through the occlusion field with respect to the total number of voxels passing above such an occlusion field as discussed in detail above. Of course, the operation 1008 can include determining that the LIDAR data represents an object in the occlusion field, in which case the occlusion field would be occupied. If a threshold number (or percentage) of returns indicate no return, the occupancy state may be unoccupied. Otherwise, the occupancy state may be indeterminate.

At operation 1010, the process can include projecting the occlusion field into segmented image data to determine an occupancy of the occlusion field. As discussed in connection with FIG. 3, and throughout this disclosure, image data captured by image sensors can be segmented to determine locations of driveable regions, vehicles, pedestrians, and the like. A location of the occlusion field can be projected into the segmented image data to determine if the location of the occlusion field corresponds to a driveable surface. If yes, the occlusion field is not occupied, but if the occlusion field projects into a vehicle, for example, the occlusion field can be determined to be occupied, or otherwise indeterminate. A determination of whether the occlusion field is occupied can be made in the operation 1012.

At operation 1012, if a threshold number of occlusion fields are occupied ("yes") or indeterminate, the process continues to operation 1014. At operation 1014, the process can include determining, base at least in part on the occupancy, that the occlusion grid is not clear. For example, if there is an insufficient number of unoccupied occlusion fields to determine that a vehicle may safely traverse the environment, the process may return. In some instances, the operation 1014 can include determining that a threshold number of occlusion fields are occupied or indeterminate. In some instances, the operation 1014 can include controlling the vehicle to navigate to location to observe a larger portion of the occlusion gird. The process can return to the operation 1004 to capture additional data to determine states of the occlusion fields and, accordingly, of the occlusion grid.

If the occlusion field is not occupied ("no" in operation 1012), the process continues to operation 1016. At operation 1016, the process can include determining, based at least in part on the occupancy, that the occlusion grid is clear, or otherwise provides sufficient information to safely traverse the environment.

At operation 1018, the process can include controlling the autonomous vehicle to traverse the environment based at least in part on the occlusion grid being clear.

Figure 11:
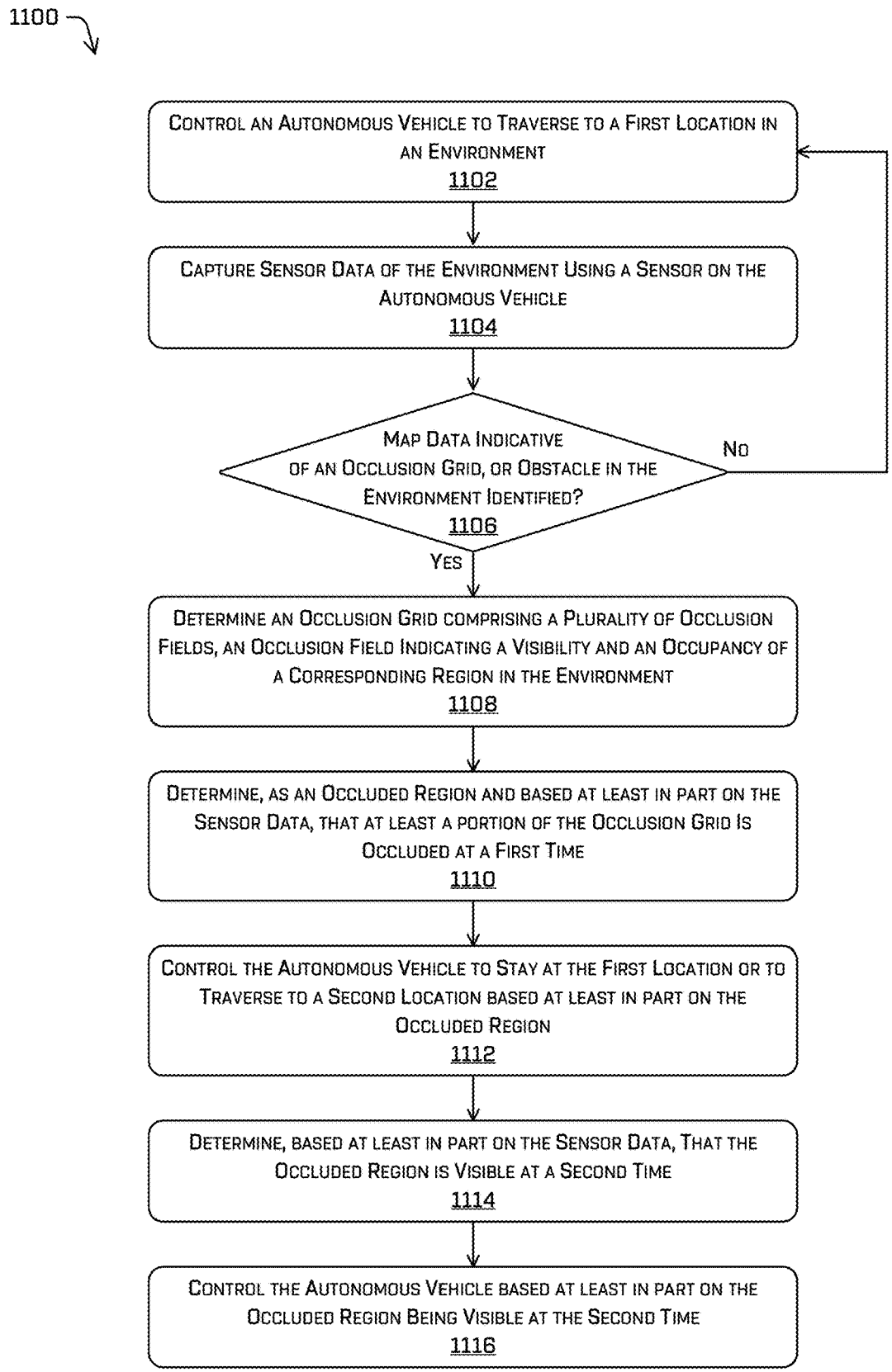
FIG. 11 depicts an example process for determining an occlusion grid based on map data being indicative of the occlusion grid or based on identifying an obstacle in the environment, and controlling a vehicle to traverse the environment, in accordance with embodiments of the disclosure.

FIG. 11 depicts an example process 1100 for determining an occlusion grid based on map data being indicative of the occlusion grid or based on identifying an obstacle in the environment, and controlling a vehicle to traverse the environment, in accordance with embodiments of the disclosure. For example, some or all of the process 1100 can be performed by one or more components in FIG. 4, as described herein. For example, some or all of the process 1100 can be performed by the vehicle computing device(s) 404.

At operation 1102, the process can include controlling an autonomous vehicle to traverse to a first location in an environment. In some cases, the first location can represent a stop line at an intersection in an environment.

At operation 1104, the process can include capturing sensor data of the environment using a sensor on the autonomous vehicle. In some examples, the operation 1104 can include capturing LIDAR data, image data, RADAR data, and the like in the environment.

At operation 1106, the process can include determining 1) whether map data is indicative of an occlusion grid or 2) whether an obstacle is identified in the environment. If "no" (e.g., the map data does not indicate that there is an occlusion grid associated with the location and there is not an object identified in the environment), the process can return to operation 1102 whereby the autonomous vehicle can move to a new location (operation 1102) and/or so that the autonomous vehicle can capture sensor data in the environment (operation 1104) in accordance with nominal driving behaviors (e.g., trajectory generation based on sensor data). If "yes" in operation 1106 (e.g., the map data indicates that there is an occlusion grid associated with the location or there is an object identified in the environment), the process continues to operation 1108.

At operation 1108, the process can include determining an occlusion grid comprising a plurality of occlusion fields, an occlusion field indicating a visibility and an occupancy of a corresponding region in the environment. In some examples, the occlusion grid can be accessed from map data, and in some examples, the occlusion grid can be generated dynamically based at least in part on identifying an object.

At operation 1110, the process can include determining, as an occluded region and based at least in part on the sensor data, that at least a portion of the occlusion grid is occluded at a first time. As discussed herein, the occluded region may not be visible to one or more sensors of the autonomous vehicle at the first time.

At operation 1112, the process can include the operation can include controlling the autonomous vehicle to stay at the first location or to traverse to a second location based at least in part on the occluded region. An example of staying at the first location is discussed in connection with FIG. 7, and an example of controlling the vehicle to traverse to a second location is discussed in connection with FIG. 6. For example, the second location can be a check line, allowing the autonomous vehicle to navigate to the second location to view more of the occlusion grid.

At operation 1114, the process can include determining, based at least in part on the sensor data, that the occluded region (or the portion of the environment corresponding to the occluded region) is visible at a second time. With respect to FIG. 6, the autonomous vehicle may navigate to the second location so that obstacles in the environment do not block the sensors from capturing data of the entirety of the occlusion grid. With respect to FIG. 7, the autonomous vehicle may wait for the obstacle to move, thereby allowing the sensors to capture data representing the occlusion grid.

At operation 1116, the process can include controlling the autonomous vehicle based at least in part on the occluded region being visible at the second time. In some examples, the operation 1116 can also include determining that the occlusion grid is not occupied, indicating that the autonomous vehicle can safely traverse through the environment.

EXAMPLE CLAUSES

A: A system comprising: one or more processors; and one or more computer-readable media storing instructions executable by the one or more processors, wherein the instructions, when executed, cause the system to perform operations comprising: capturing LIDAR data using a LIDAR sensor on an autonomous vehicle; accessing map data representing an environment proximate to the autonomous vehicle, the map data comprising an occlusion grid comprising multiple occlusion fields, wherein an occlusion field of the multiple occlusion fields is associated with an occlusion state and an occupancy state of a portion of the environment; ray casting a portion of the LIDAR data to determine the occupancy state and the occlusion state of the occlusion field; determining, based at least in part on the occlusion field, a sufficiency of information associated with the occlusion grid to determine a safe trajectory for the autonomous vehicle to traverse the environment; and controlling the autonomous vehicle to traverse the environment in accordance with the safe trajectory.

B: The system of paragraph A, the operations further comprising: capturing image data using an image sensor on the autonomous vehicle; performing semantic segmentation on at least a portion of the image data to generate segmented image data identifying at least a driveable surface in the environment; projecting the occlusion field into the segmented image data; determining that the occlusion field projects into the driveable surface; and controlling the autonomous vehicle to traverse the environment based at least in part on the occlusion field projecting into the driveable surface.

C: The system of paragraph A or B, wherein the multiple occlusion fields discretize a portion of a driveable surface in the environment, wherein the occlusion state of the occlusion field is indicative of a visibility of the occlusion field by the LIDAR sensor.

D: The system of any of paragraphs A-C, the operations further comprising: determining a confidence value associated with the occupancy state of the occlusion field based at least in part on: a first number of LIDAR returns associated with the occlusion field; and a second number of discretized regions associated with the occlusion field.

E: The system of paragraph D, wherein a first ratio of the first number with respect to the second number being below a threshold is indicative of a high confidence of an unoccupied state of the occlusion field, and a second ratio of the first number with respect to the second number being above the threshold is indicative of a high confidence of an occupied state of the occlusion field.

F: A method comprising: capturing sensor data using a sensor on a robotic platform; determining, based at least in part on the sensor data, a location of the robotic platform; accessing map data representing an environment proximate to the robotic platform at the location, the map data comprising an occlusion grid; determining an occupancy state of an occlusion field of the occlusion grid; determining, based at least in part on the occlusion field, a sufficiency of information to determine a trajectory to traverse an area of the environment proximate to the occlusion grid; and controlling the robotic platform based at least in part on the occupancy state of the occlusion grid.

G: The method of paragraph F, further comprising: capturing, as the sensor data, LIDAR data using a LIDAR sensor on the robotic platform; ray casting a portion of the LIDAR data to determine the occupancy state of the occlusion field, the occupancy state comprising one of an occupied state, an unoccupied state, or an indeterminate state; ray casting a portion of the LIDAR data to determine an occlusion state of the occlusion field, the occlusion state comprising one of visible or occluded; and controlling the robotic platform to traverse the environment based at least in part on the occlusion grid being clear, wherein the sufficiency of information is determined based at least in part on a number of occlusion fields of the occlusion grid that are visible to the LIDAR sensor relative to at least one of a size of the occlusion grid or a speed limit associated with the occlusion grid.

H: The method of paragraph G, wherein the ray casting comprises: determining a first number of expected LIDAR returns associated with a region above the occlusion field; determining a second number of actual LIDAR returns associated with the region above the occlusion field; determining a confidence value associated with the occupancy of the occlusion field based at least in part on the first number of expected LIDAR returns and the second number of actual LIDAR returns; and determining that the confidence value meets or exceeds a threshold confidence value.

I: The method of any of paragraphs F-H, further comprising: capturing, as the sensor data, image data using an image sensor on the robotic platform; performing segmentation on at least a portion of the image data to generate segmented image data identifying a driveable surface in the environment; projecting the occlusion field into the segmented image data; determining that the occlusion field projects into the driveable surface; and controlling the robotic platform to traverse the environment based at least in part on the occlusion field projecting into the driveable surface.

J: The method of any of paragraphs F-I, wherein the robotic platform comprises an autonomous vehicle and the environment proximate to the autonomous vehicle comprises an intersection, the method further comprising: determining a distance of the intersection for the autonomous vehicle to traverse; determining a speed limit associated with the intersection; and determining an extent of the occlusion grid based at least in part on: the distance of the intersection; the speed limit; and a safety factor.

K: The method of paragraph J, further comprising determining the extent of the occlusion grid based at least in part on an expected amount of time for the autonomous vehicle to traverse the distance of the intersection.

L: The method of any of paragraphs F-K, wherein the occlusion field comprises a temporal logic symbol, the method further comprising: validating a trajectory based at least in part on evaluating a temporal logic formula comprising the temporal logic symbol; and controlling the robotic platform to traverse the environment based at least in part on the trajectory.

M: The method of any of paragraphs F-L, wherein the occlusion grid comprises a plurality of occlusion fields, the method further comprising: determining that a threshold number of the plurality of occlusion fields are visible to the sensor and are unoccupied prior to controlling the robotic platform to traverse the environment.

N: The method of any of paragraphs F-M, further comprising: determining that a portion of the occlusion grid is not visible to the sensor; and controlling the robotic platform to move to a location to increase the portion of the occlusion grid that is visible to the sensor.

O: A non-transitory computer-readable medium storing instructions that, when executed, cause one or more processors to perform operations comprising: receiving sensor data captured using a sensor on a robotic platform; determining, based at least in part on the sensor data, a location of the robotic platform accessing map data representing an environment proximate to the robotic platform at the location, the map data comprising an occlusion grid; determining an occupancy state of an occlusion field of the occlusion grid; determining, based at least in part on the occlusion field, a sufficiency of information to determine a trajectory to traverse an area of the environment proximate to the occlusion grid; and controlling the robotic platform based at least in part on the state of the occlusion grid.

P: The non-transitory computer-readable medium of paragraph O, wherein the sensor data is LIDAR data and wherein the sensor is a LIDAR sensor, the operations further comprising: ray casting a portion of the LIDAR data to determine the occupancy state and an occlusion state of the occlusion field; determining, based at least in part on the occupancy state and the occlusion state, the sufficiency of information associated with the occlusion grid; and controlling the robotic platform to traverse the environment based at least in part on the sufficiency of information.

Q: The non-transitory computer-readable medium of paragraph P, wherein the ray casting comprises: determining a first number of expected LIDAR returns associated with a region above the occlusion field; determining a second number of actual LIDAR returns associated with the region above the occlusion field; determining a confidence value associated with the occupancy state of the occlusion field based at least in part on the first number of expected LIDAR returns and the second number of actual LIDAR returns; and determining that the confidence value meets or exceeds a threshold confidence value, wherein the confidence level meeting or exceeding the threshold confidence value indicates that the occlusion field is unoccupied.

R: The non-transitory computer-readable medium of any of paragraphs O-Q, capturing, as the sensor data, image data using an image sensor on the robotic platform; performing segmentation on at least a portion of the image data to generate segmented image data identifying a driveable surface in the environment; projecting the occlusion field into the segmented image data; and determining that the occlusion field projects into the driveable surface.

S: The non-transitory computer-readable medium of any of paragraphs O-R, the operations further comprising: determining that a portion of the occlusion grid is not visible to the sensor; and controlling the robotic platform to move to a location where an entirety of the occlusion grid is visible to the sensor, wherein a velocity of the robotic platform is below a velocity threshold.

T: The non-transitory computer-readable medium of any of paragraphs O-S, wherein the sensor data is first sensor data, the operations further comprising: receiving, as the first sensor data, image data captured by an image sensor on the robotic platform; receiving, as second sensor data, LIDAR data captured by a LIDAR sensor on the robotic platform; and determining, based at least in part on the first sensor data and the second sensor data, a confidence value associated with the occupancy state of the occlusion field.

U: A system comprising: one or more processors; and one or more computer-readable media storing instructions executable by the one or more processors, wherein the instructions, when executed, cause the system to perform operations comprising: controlling an autonomous vehicle to traverse to a first location in an environment; capturing, as sensor data, at least LIDAR data or image data of the environment using a sensor of the autonomous vehicle; determining, based at least in part on accessing map data or on identifying an obstacle in an environment, an occlusion grid comprising a plurality of occlusion fields, an occlusion field of the occlusion grid indicating an occlusion state and an occupancy state of a corresponding region of the environment; determining, as an occluded region and based at least in part on the sensor data, that at least a first portion of the occlusion grid is occluded at a first time; determining, as an un-occluded region and based at least in part on the sensor data, that at least a second portion of the occlusion grid is un-occluded at the first time; determining, based at least in part on an extent and occupancy of the second portion, a confidence level associated with safely traversing a trajectory through the environment; controlling the autonomous vehicle to stay at the first location or to traverse to a second location based at least in part on the confidence level being below a threshold level; determining, based at least in part on the sensor data, that a third portion of the occlusion grid is visible and unoccupied at a second time; and controlling the autonomous vehicle based at least in part on the third portion of the occlusion grid being visible an unoccupied at the second time.

V: The system of paragraph U, the operations further comprising one or more of: determining that the autonomous vehicle is approaching an intersection where the autonomous vehicle is required to yield to other traffic; determining that the obstacle is associated with a dynamic occlusion grid;

determining a predicted trajectory of a dynamic obstacle that traversed within the occlusion grid; or determining the occlusion grid based on a topographic occlusion region.

W: The system of paragraph U or V, wherein the sensor data comprises the LIDAR data and the sensor is a LIDAR sensor, the operations further comprising: ray casting a portion of the LIDAR data to determine the occlusion state and the occupancy state of the occlusion field.

X: The system of any of paragraphs U-W, wherein the sensor data is image data and the sensor is an image sensor, the operations further comprising: performing segmentation on at least a portion of the image data to generate segmented image data identifying a driveable surface in the environment; projecting the occlusion field into the segmented image data; determining that the occlusion field projects into the driveable surface; and controlling the autonomous vehicle to traverse the environment based at least in part on the occlusion field projecting into the driveable surface.

Y: The system of any of paragraphs U-X, the operations further comprising: determining a first number of un-occluded and unoccupied occlusion fields of the plurality of occlusion fields; determining that the first number does not meet or exceed a threshold number of occlusion fields associated with safe traversal of the environment; and controlling the autonomous vehicle to stay at the first location or to traverse to the second location based at least in part on the first number not meeting or exceeding the threshold number.

Z: A method comprising: controlling an autonomous vehicle to traverse to a first location in an environment; determining, based at least in part on accessing map data or on identifying an obstacle in an environment, an occlusion grid; determining, as an occluded region, that at least a first portion of the occlusion grid is occluded at a first time; determining, as an un-occluded region, that at least a second portion of the occlusion grid is visible at the first time; determining an occupancy state of the un-occluded region; controlling the autonomous vehicle to stay at the first location or traverse to a second location based at least in part on an extent of the un-occluded region and the occupancy state of the un-occluded region; determining that a third portion of the occlusion grid is un-occluded and unoccupied at a second time; and controlling the autonomous vehicle based at least in part on the third portion of the occlusion grid being un-occluded and unoccupied at the second time.

AA: The method of paragraph Z, further comprising: determining that the autonomous vehicle is approaching an intersection in an environment, wherein the autonomous vehicle lacks a right of way at the intersection; wherein: the first location is a stop line associated with the intersection; and the second location is a check line at least partially past the stop line and within the intersection.

AB: The method of paragraph AA, further comprising: controlling the autonomous vehicle to traverse from the first location to the second location at a first velocity below a threshold velocity; determining capturing sensor data at the second location; determining, based at least in part on the sensor data, that the third portion is un-occluded and unoccupied at the second time; determining that an extent of the third portion meets or exceeds a threshold; and controlling the autonomous vehicle to traverse from the second location through the intersection at a second velocity above the threshold velocity.

AC: The method of any of paragraphs Z-AB, wherein the obstacle is a dynamic obstacle, the method further comprising: identifying the dynamic obstacle in the environment; associating the occlusion grid with the dynamic obstacle; controlling the autonomous vehicle to stay at the first location based at least in part on the extent of the un-occluded region and the occupancy state of the un-occluded region at the first time; and controlling the autonomous vehicle based at least in part on the third portion of the occlusion grid being un-occluded and unoccupied at the second time.

AD: The method of any of paragraphs Z-AC, further comprising: identifying the obstacle in the environment; associating the occlusion grid with the obstacle; identifying a dynamic object in the environment; capturing motion data of the dynamic object in the environment; determining that the dynamic object traversed into the occluded region; determining a predicted trajectory for the dynamic object within the occluded region; and controlling the autonomous vehicle based at least in part on the predicted trajectory of the dynamic object.

AE: The method of any of paragraphs Z-AD, further comprising: determining that the autonomous vehicle is within a threshold distance to a topographic occlusion region; and determining, as a topographic occlusion grid, the occlusion grid based at least in part on the map data associated with the topographic occlusion region.

AF: The method of any of paragraphs Z-AE, further comprising: capturing LIDAR data using a LIDAR sensor on the autonomous vehicle; and ray casting a portion of the LIDAR data to determine an occlusion state and an occupancy state of an occlusion field, the occlusion field representing a portion of the occlusion grid.

AG: The method of any of paragraphs Z-AF, further comprising: capturing image data using an image sensor on the autonomous vehicle; performing segmentation on at least a portion of the image data to generate segmented image data identifying a driveable surface in the environment; projecting an occlusion field into the segmented image data, the occlusion field representing a portion of the occlusion grid; determining that the occlusion field projects into the driveable surface; and controlling the autonomous vehicle to traverse the environment based at least in part on the occlusion field projecting into the driveable surface.

AH: The method of any of paragraphs Z-AG, further comprising: controlling the autonomous vehicle to traverse a portion of the environment based on a velocity selected based at least in part on a first extent of the portion to traverse in the environment and a second extent of the third portion of the occlusion grid being un-occluded and unoccupied.

AI: The method of any of paragraphs Z-AH, further comprising: determining a time period associated with the occluded region; determining that no objects have entered the occluded region during the time period; and determining, based at least in part on a speed limit associated with the occluded region, a confidence level associated with an occupancy of the occluded region based at least in part on the time period.

AJ: A non-transitory computer-readable medium storing instructions that, when executed, cause one or more processors to perform operations comprising: controlling a robotic platform to traverse to a first location in an environment; determining a location of the robotic platform with respect to a map, the map comprising map data; determining, based at least in part on accessing the map data associated with the location or on identifying an obstacle in an environment proximate to the robotic platform, an occlusion grid; determining, as an occluded region, that at least a first portion of the occlusion grid is occluded at a first time; determining, as an un-occluded region, that at least a second portion of the occlusion grid is visible at the first time; determining an occupancy state of the un-occluded region; controlling the robotic platform to stay at the first location or traverse to a second location based at least in part on an extent of the un-occluded region and the occupancy state of the un-occluded region; determining that a third portion of the occlusion grid is un-occluded and unoccupied at a second time; and controlling the robotic platform based at least in part on the third portion being un-occluded and unoccupied at the second time.

AK: The non-transitory computer-readable medium of paragraph AJ, the operations further comprising: determining that the robotic platform is approaching an intersection in an environment, wherein the robotic platform is required to yield to other vehicles; wherein: the first location is a stop line associated with the intersection; and the second location is a check line at least partially past the stop line and within the intersection.

AL: The non-transitory computer-readable medium of paragraph AJ or AK, the operations further comprising: capturing LIDAR data using a LIDAR sensor on the robotic platform; ray casting a portion of the LIDAR data to determine an occupancy of an occlusion field, the occlusion field representing a portion of the occlusion grid; and determining, based at least in part on the occupancy, that the occlusion grid is visible and unoccupied.

AM: The non-transitory computer-readable medium of any of paragraphs AJ-AL, the operations further comprising: capturing image data using an image sensor on the robotic platform; performing segmentation on at least a portion of the image data to generate segmented image data identifying a driveable surface in the environment; projecting an occlusion field into the segmented image data, the occlusion field representing a portion of the occlusion grid; determining that the occlusion field projects into the driveable surface; and controlling the robotic platform to traverse the environment based at least in part on the occlusion field projecting into the driveable surface.

AN: The non-transitory computer-readable medium of any of paragraphs AJ-AM, the operations further comprising: determining a time period associated with the occluded region; determining that no objects have entered the occluded region during the time period; and determining a confidence level associated with a safe trajectory.

While the example clauses described above are described with respect to one particular implementation, it should be understood that, in the context of this document, the content of the example clauses can also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors that cause the system to perform operations comprising:
controlling an autonomous vehicle to traverse to a first location in an environment;
capturing, as sensor data, at least LIDAR data or image data of the environment using a sensor of the autonomous vehicle;
determining, based at least in part on accessing map data or on identifying an obstacle in the environment, an occlusion grid comprising a plurality of occlusion fields, an occlusion field of the occlusion grid indicating an occlusion state and an occupancy state of a corresponding region of the environment;
determining, as an occluded region and based at least in part on the sensor data, that at least a first portion of the occlusion grid is occluded at a first time;
determining, as an un-occluded region and based at least in part on the sensor data, that at least a second portion of the occlusion grid is un-occluded at the first time;
determining, based at least in part on an extent and occupancy of the second portion, a confidence level associated with safely traversing a trajectory through the environment;
controlling the autonomous vehicle to stay at the first location or to traverse to a second location based at least in part on the confidence level being below a threshold level;
determining, based at least in part on the sensor data, that a third portion of the occlusion grid is visible and unoccupied at a second time; and
controlling the autonomous vehicle based at least in part on the third portion of the occlusion grid being visible and unoccupied at the second time.

2. The system of claim 1, the operations further comprising one or more of:
determining that the autonomous vehicle is approaching an intersection where the autonomous vehicle is required to yield to other traffic;
determining that the obstacle is associated with a dynamic occlusion grid;
determining a predicted trajectory of a dynamic obstacle that traversed within the occlusion grid; or
determining the occlusion grid based on a topographic occlusion region.

3. The system of claim 1, wherein the sensor data comprises the LIDAR data and the sensor is a LIDAR sensor, the operations further comprising:
ray casting a portion of the LIDAR data to determine the occlusion state and the occupancy state of the occlusion field.

4. The system of claim 1, wherein the sensor data is image data and the sensor is an image sensor, the operations further comprising:
performing segmentation on at least a portion of the image data to generate segmented image data identifying a driveable surface in the environment;

projecting the occlusion field into the segmented image data;
determining that the occlusion field projects into the driveable surface; and
controlling the autonomous vehicle to traverse the environment based at least in part on the occlusion field projecting into the driveable surface.

5. The system of claim 1, the operations further comprising:
determining a first number of un-occluded and unoccupied occlusion fields of the plurality of occlusion fields;
determining that the first number does not meet or exceed a threshold number of occlusion fields associated with safe traversal of the environment; and
controlling the autonomous vehicle to stay at the first location or to traverse to the second location based at least in part on the first number not meeting or exceeding the threshold number.

6. A method comprising:
controlling an autonomous vehicle to traverse to a first location in an environment;
determining, based at least in part on accessing map data or on identifying an obstacle in the environment, an occlusion grid;
determining, as an occluded region, that at least a first portion of the occlusion grid is occluded at a first time;
determining, as an un-occluded region, that at least a second portion of the occlusion grid is visible at the first time;
determining an occupancy state of the un-occluded region;
controlling the autonomous vehicle to stay at the first location or traverse to a second location based at least in part on an extent of the un-occluded region and the occupancy state of the un-occluded region;
determining that a third portion of the occlusion grid is un-occluded and unoccupied at a second time; and
controlling the autonomous vehicle based at least in part on the third portion of the occlusion grid being un-occluded and unoccupied at the second time.

7. The method of claim 6, further comprising:
determining that the autonomous vehicle is approaching an intersection in the environment, wherein the autonomous vehicle lacks a right of way at the intersection;
wherein:
the first location is a stop line associated with the intersection; and
the second location is a check line at least partially past the stop line and within the intersection.

8. The method of claim 7, further comprising:
controlling the autonomous vehicle to traverse from the first location to the second location at a first velocity below a threshold velocity;
receiving sensor data associated with the second location;
determining, based at least in part on the sensor data, that the third portion is un-occluded and unoccupied at the second time;
determining that an extent of the third portion meets or exceeds a threshold; and
controlling the autonomous vehicle to traverse from the second location through the intersection at a second velocity above the threshold velocity.

9. The method of claim 6, wherein the obstacle is a dynamic obstacle, the method further comprising:
identifying the dynamic obstacle in the environment;
associating the occlusion grid with the dynamic obstacle;
controlling the autonomous vehicle to stay at the first location based at least in part on the extent of the un-occluded region and the occupancy state of the un-occluded region at the first time; and
controlling the autonomous vehicle based at least in part on the third portion of the occlusion grid being un-occluded and unoccupied at the second time.

10. The method of claim 6, further comprising:
identifying the obstacle in the environment;
associating the occlusion grid with the obstacle;
identifying a dynamic object in the environment;
capturing motion data of the dynamic object in the environment;
determining that the dynamic object traversed into the occluded region;
determining a predicted trajectory for the dynamic object within the occluded region; and
controlling the autonomous vehicle based at least in part on the predicted trajectory of the dynamic object.

11. The method of claim 6, further comprising:
determining that the autonomous vehicle is within a threshold distance to a topographic occlusion region; and
determining, as a topographic occlusion grid, the occlusion grid based at least in part on the map data associated with the topographic occlusion region.

12. The method of claim 6, further comprising:
capturing LIDAR data using a LIDAR sensor on the autonomous vehicle; and
ray casting a portion of the LIDAR data to determine an occlusion state and an occupancy state of an occlusion field, the occlusion field representing a portion of the occlusion grid.

13. The method of claim 6, further comprising:
capturing image data using an image sensor on the autonomous vehicle;
performing segmentation on at least a portion of the image data to generate segmented image data identifying a driveable surface in the environment;
projecting an occlusion field into the segmented image data, the occlusion field representing a portion of the occlusion grid;
determining that the occlusion field projects into the driveable surface; and
controlling the autonomous vehicle to traverse the environment based at least in part on the occlusion field projecting into the driveable surface.

14. The method of claim 6, further comprising:
controlling the autonomous vehicle to traverse a portion of the environment based on a velocity selected based at least in part on a first extent of the portion to traverse in the environment and a second extent of the third portion of the occlusion grid being un-occluded and unoccupied.

15. The method of claim 6, further comprising:
determining a time period associated with the occluded region;
determining that no objects have entered the occluded region during the time period; and
determining, based at least in part on a speed limit associated with the occluded region, a confidence level associated with an occupancy of the occluded region based at least in part on the time period.

16. A non-transitory computer-readable medium storing instructions that, when executed, cause one or more processors to perform operations comprising:

controlling a robotic platform to traverse to a first location in an environment;
determining a location of the robotic platform with respect to a map, the map comprising map data;
determining, based at least in part on accessing the map data associated with the location or on identifying an obstacle in the environment proximate to the robotic platform, an occlusion grid;
determining, as an occluded region, that at least a first portion of the occlusion grid is occluded at a first time;
determining, as an un-occluded region, that at least a second portion of the occlusion grid is visible at the first time;
determining an occupancy state of the un-occluded region;
controlling the robotic platform to stay at the first location or traverse to a second location based at least in part on an extent of the un-occluded region and the occupancy state of the un-occluded region;
determining that a third portion of the occlusion grid is un-occluded and unoccupied at a second time; and
controlling the robotic platform based at least in part on the third portion being un-occluded and unoccupied at the second time.

17. The non-transitory computer-readable medium of claim 16, the operations further comprising:
determining that the robotic platform is approaching an intersection in the environment, wherein the robotic platform is required to yield to other vehicles;
wherein:
the first location is a stop line associated with the intersection; and
the second location is a check line at least partially past the stop line and within the intersection.

18. The non-transitory computer-readable medium of claim 16, the operations further comprising:
capturing LIDAR data using a LIDAR sensor on the robotic platform;
ray casting a portion of the LIDAR data to determine an occupancy of an occlusion field, the occlusion field representing a portion of the occlusion grid; and
determining, based at least in part on the occupancy, that the occlusion grid is visible and unoccupied.

19. The non-transitory computer-readable medium of claim 16, the operations further comprising:
capturing image data using an image sensor on the robotic platform;
performing segmentation on at least a portion of the image data to generate segmented image data identifying a driveable surface in the environment;
projecting an occlusion field into the segmented image data, the occlusion field representing a portion of the occlusion grid;
determining that the occlusion field projects into the driveable surface; and
controlling the robotic platform to traverse the environment based at least in part on the occlusion field projecting into the driveable surface.

20. The non-transitory computer-readable medium of claim 16, the operations further comprising:
determining a time period associated with the occluded region;
determining that no objects have entered the occluded region during the time period; and
determining a confidence level associated with a safe trajectory.

* * * * *